(12) United States Patent
Staamann et al.

(10) Patent No.: US 7,441,265 B2
(45) Date of Patent: Oct. 21, 2008

(54) METHOD AND SYSTEM FOR SESSION BASED AUTHORIZATION AND ACCESS CONTROL FOR NETWORKED APPLICATION OBJECTS

(75) Inventors: Sebastian Staamann, Berlin (DE); Tim Eckardt, Berlin (DE)

(73) Assignee: Prismtech GmbH, Berlin (DE)

( * ) Notice: Subject to any disclaimer, the term of this patent is extended or adjusted under 35 U.S.C. 154(b) by 966 days.

(21) Appl. No.: 10/296,613

(22) PCT Filed: May 12, 2001

(86) PCT No.: PCT/EP01/05433

§ 371 (c)(1),
(2), (4) Date: Nov. 22, 2002

(87) PCT Pub. No.: WO02/13437

PCT Pub. Date: Feb. 14, 2002

(65) Prior Publication Data

US 2003/0145094 A1 Jul. 31, 2003

(30) Foreign Application Priority Data

Aug. 4, 2000 (EP) .................................. 00116864

(51) Int. Cl.
*G06F 21/00* (2006.01)
*H04L 9/00* (2006.01)

(52) U.S. Cl. .............................. 726/4; 709/229; 726/27

(58) Field of Classification Search .................. 709/229, 709/203, 227; 726/4
See application file for complete search history.

(56) References Cited

U.S. PATENT DOCUMENTS

| | | | | |
|---|---|---|---|---|
| 5,414,852 A | * | 5/1995 | Kramer et al. | 718/104 |
| 5,852,666 A | * | 12/1998 | Miller et al. | 713/167 |
| 6,377,994 B1 | * | 4/2002 | Ault et al. | 709/229 |
| 6,892,307 B1 | * | 5/2005 | Wood et al. | 726/8 |

FOREIGN PATENT DOCUMENTS

| | | |
|---|---|---|
| EP | 0 447 038 A2 | 9/1991 |
| EP | 0 816 969 A2 | 1/1998 |
| EP | 0 989 712 A2 | 3/2000 |
| EP | 1 191 762 A2 | 3/2002 |
| WO | WO - 99/28819 | 6/1999 |

* cited by examiner

*Primary Examiner*—Gilberto Barron, Jr.
*Assistant Examiner*—Laurel Lashley
(74) *Attorney, Agent, or Firm*—Thelen LLP

(57) ABSTRACT

The present invention relates to an ingress-session-based authorization and access control method and system to control access from an initiator-host (IH) to objects (Target 1, Target 2) on a target host (TH) by receiving an access-request, preferably a request-message (M1), originally coming from the initiator-host (IH), that references an object (Target 1, Target 2) on the target host (TH) to access, assigning the access-request (M1) to an ingress-session and selecting a session-context (SC-U, SC-W, SC-Y) belonging to that ingress-session, checking whether the access to the referenced object (Target 1, Target 2) is authorized in the selected session-context (SC-U, SC-W, SC-Y)or not wherein references to objects (Target 1, Target 2) on the target host (TH) were handed over to the initiator-host (IH) as a response to an access-request already granted and wherein the object the reference is handed over for is authorized for access under the handed over reference in that session-context (SC-U, SC-W, SC-Y)the already granted access-request is assigned to.

21 Claims, 15 Drawing Sheets

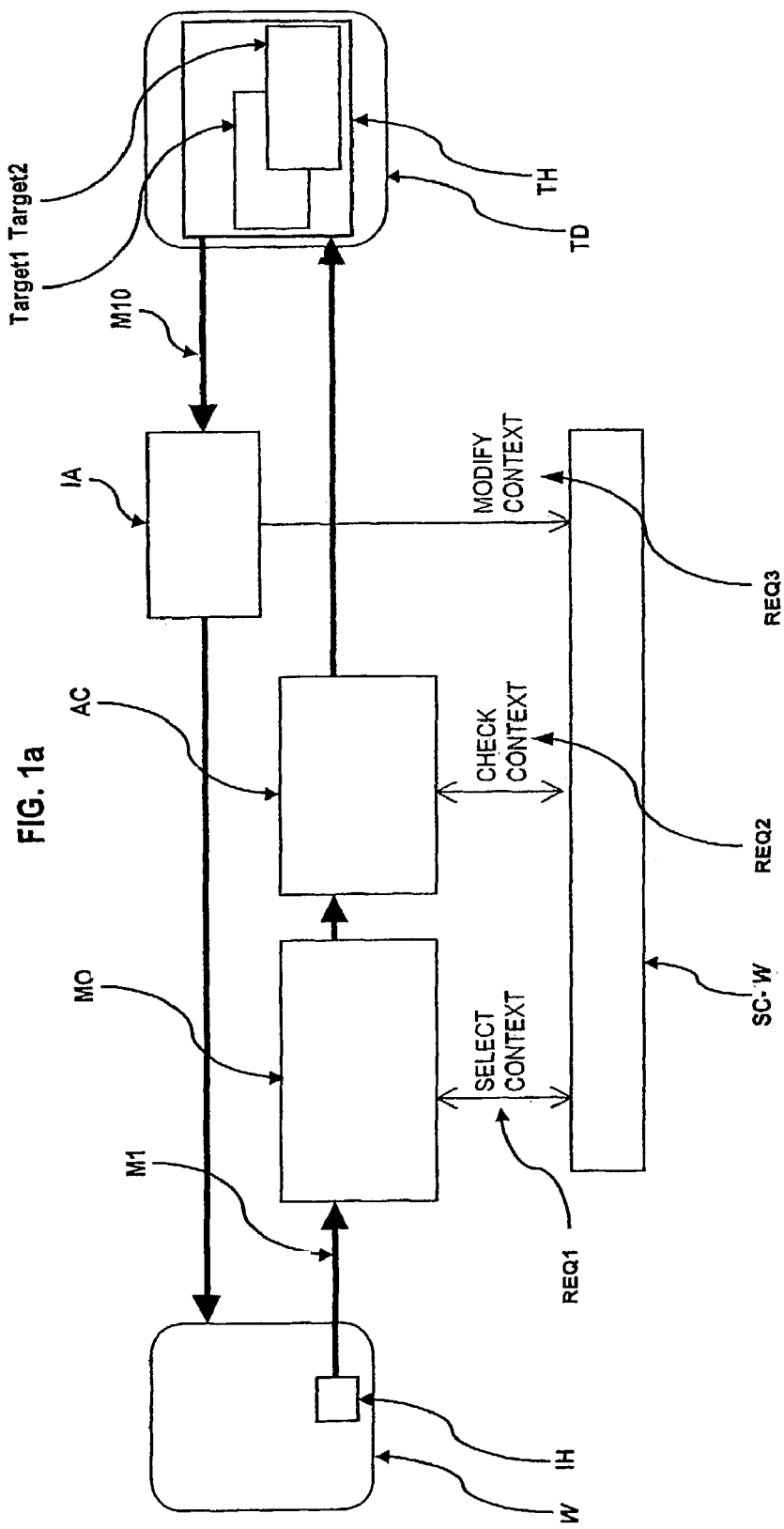

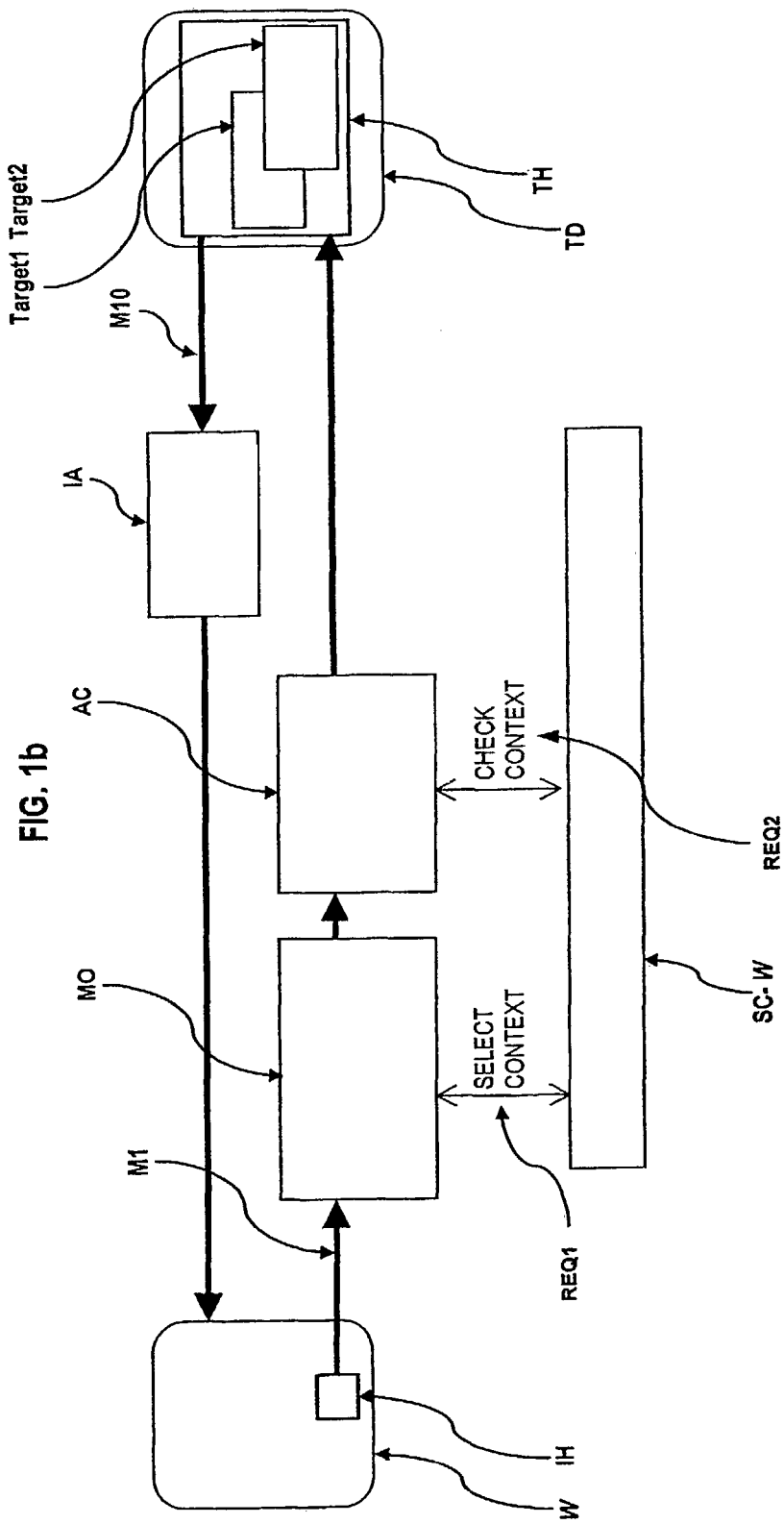

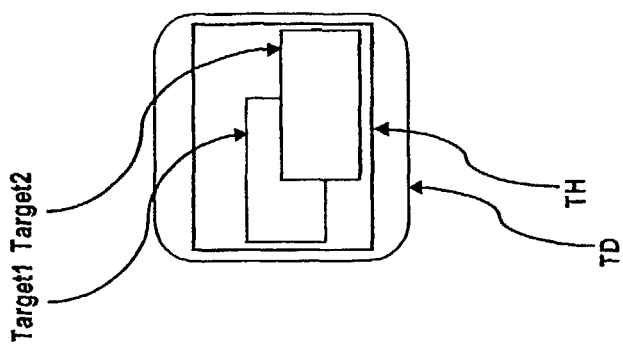
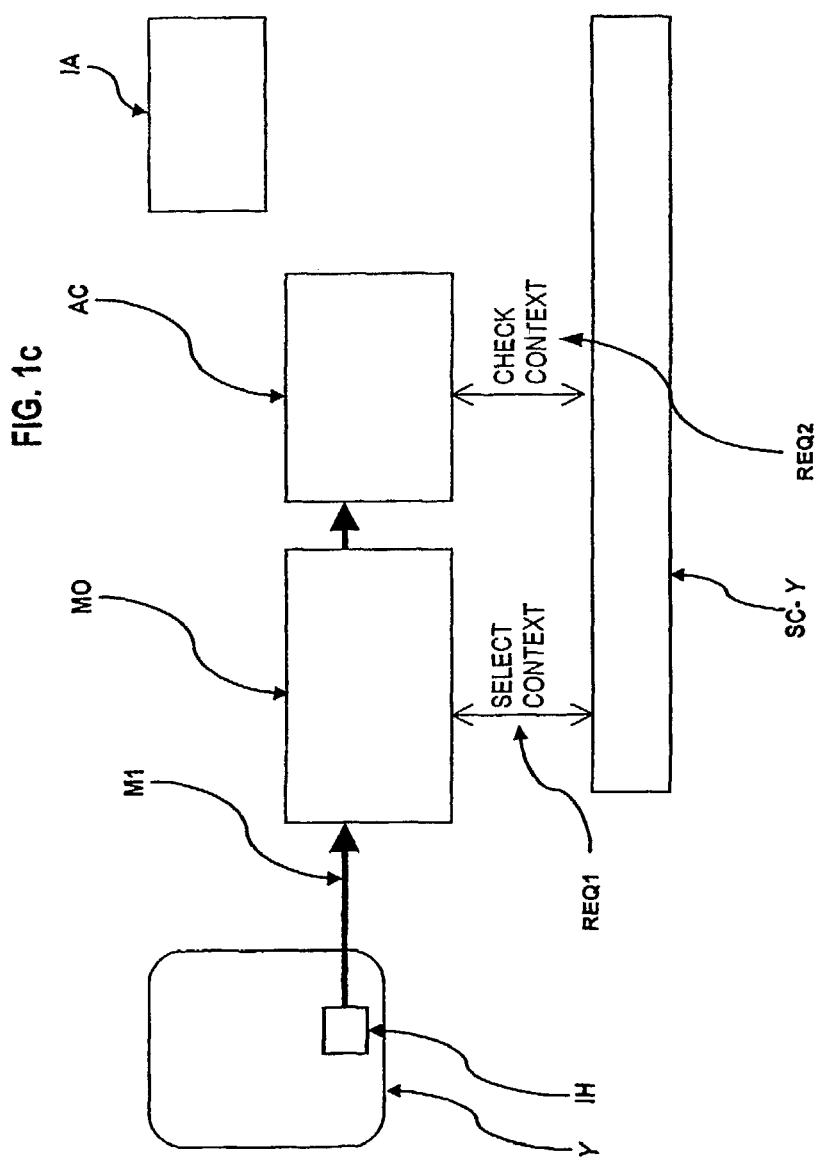
FIG. 1c

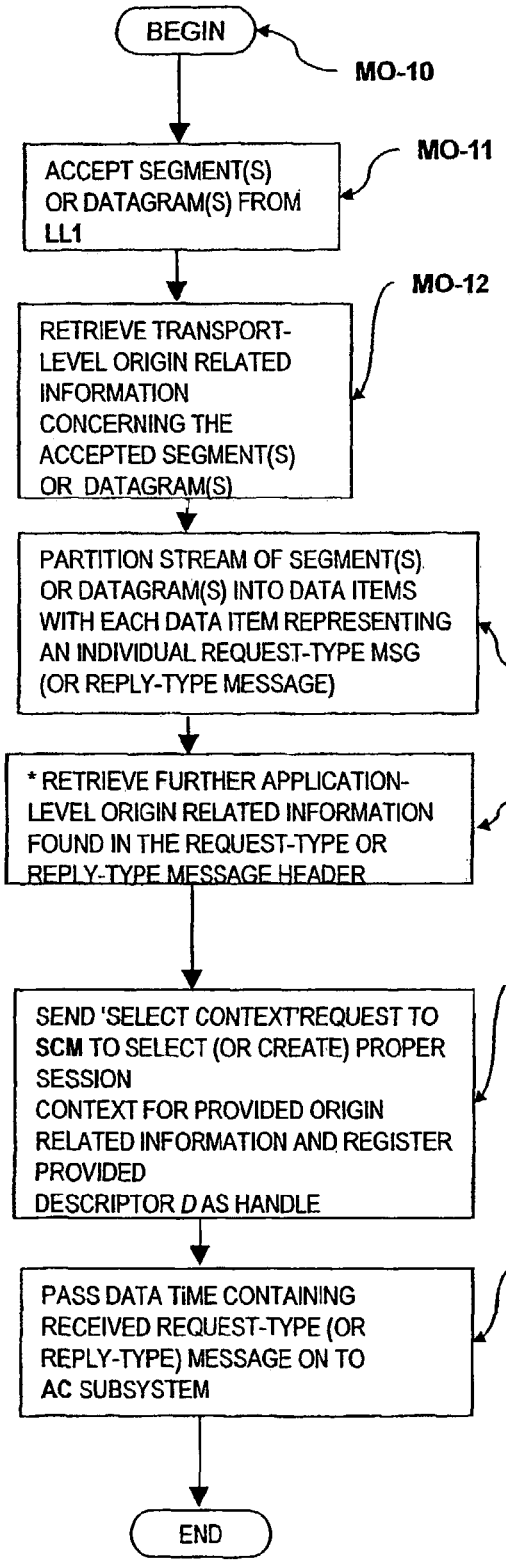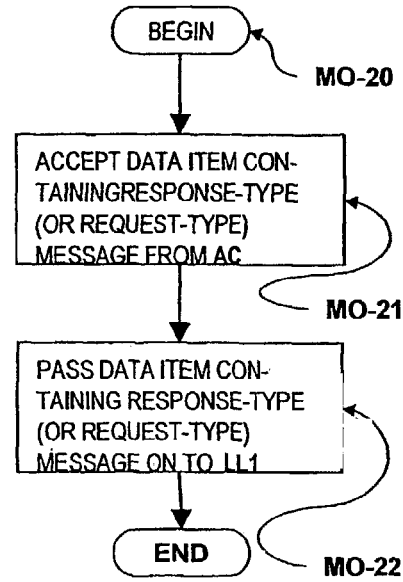

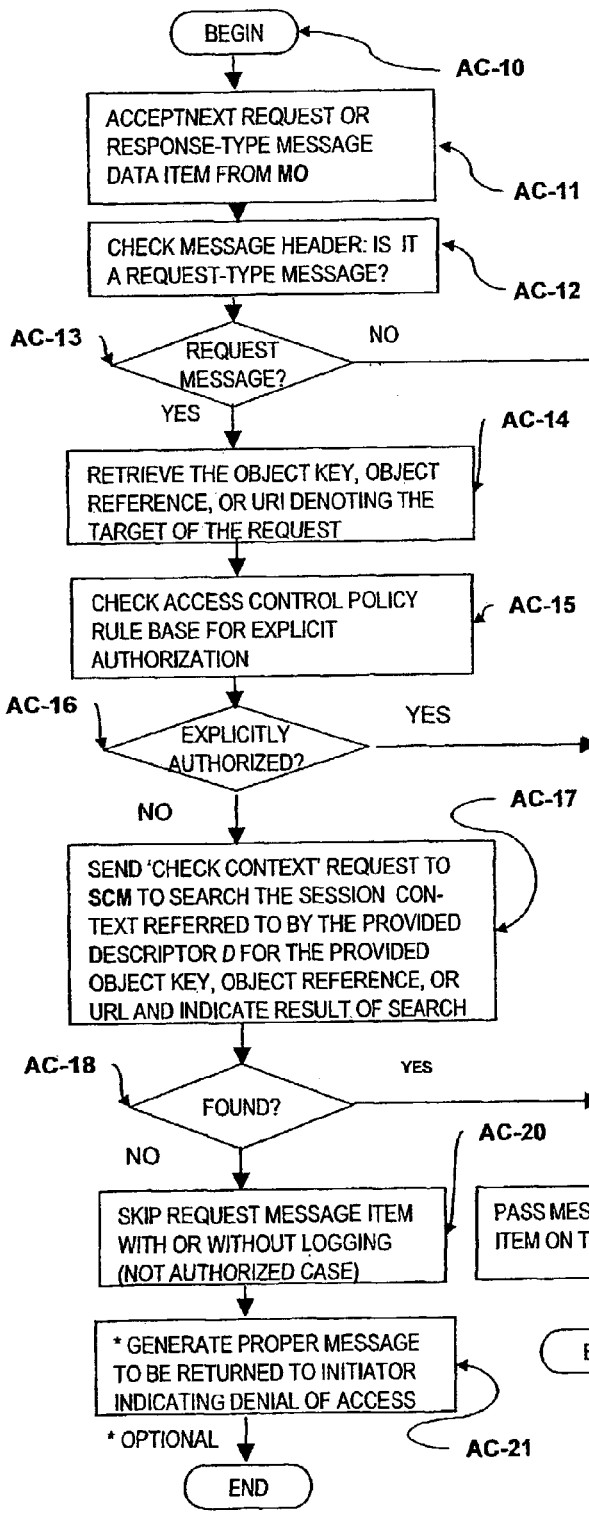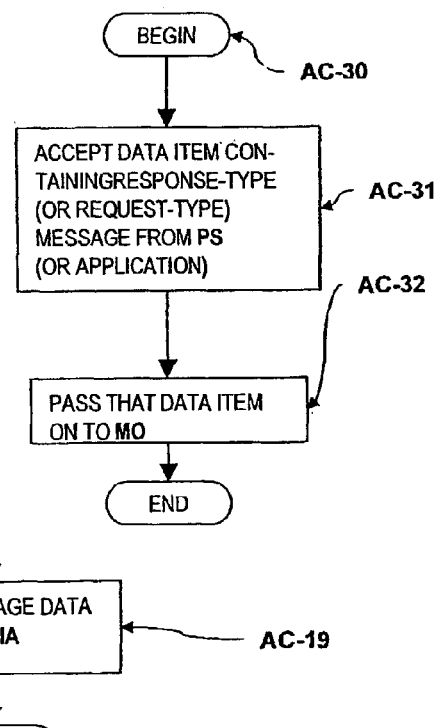
FIG. 6a
DIRECTION: INITIATOR TO TARGET
FIG. 6b
DIRECTION: TARGET TO INITIATOR

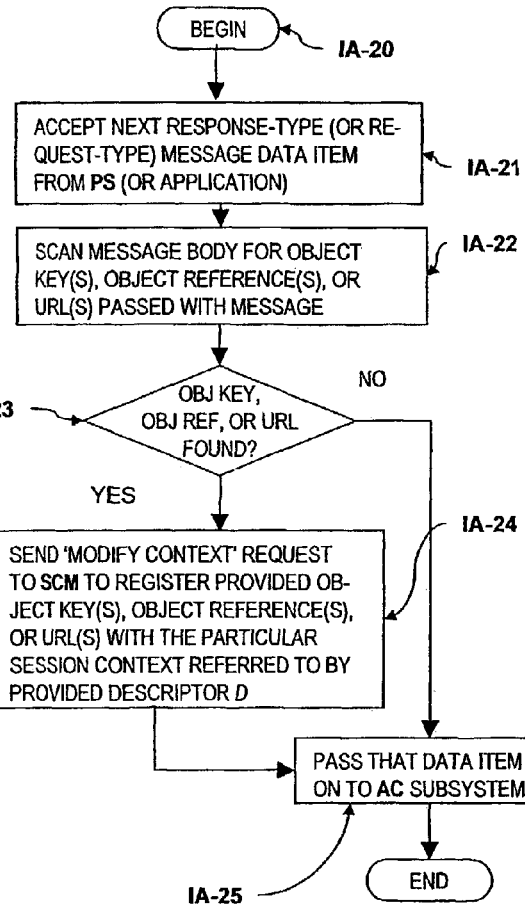
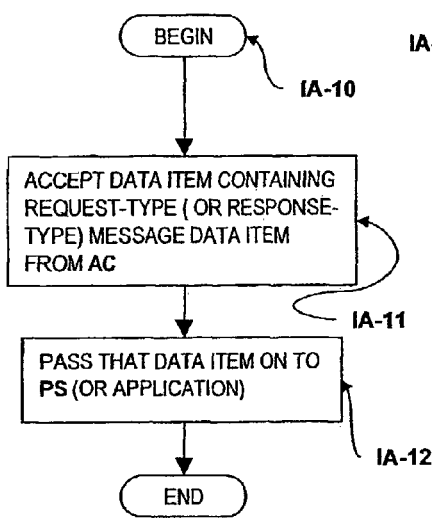
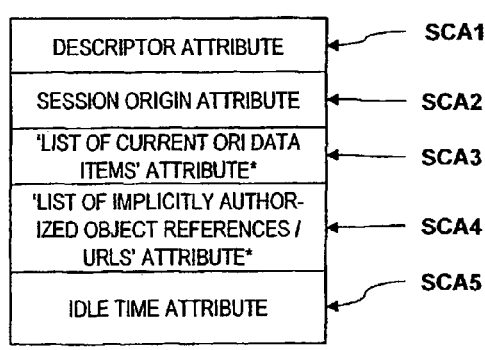

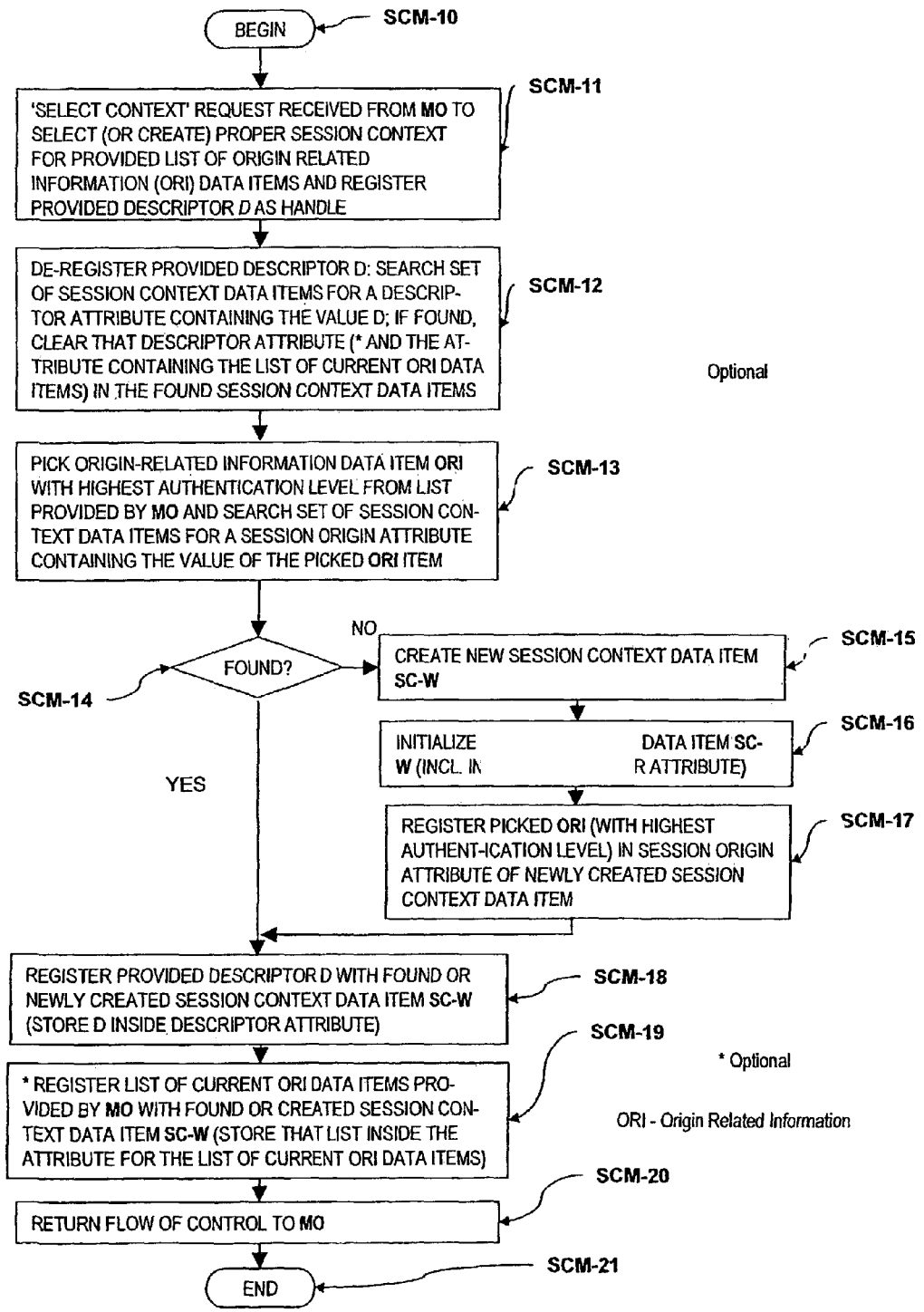

METHOD AND SYSTEM FOR SESSION BASED AUTHORIZATION AND ACCESS CONTROL FOR NETWORKED APPLICATION OBJECTS

This invention relates, in general, to a method for controlling computer network security.

BACKGROUND OF THE INVENTION

Specifically the present invention relates to a method to control the access to application objects which, in order to make them accessible for users and application processes over one or more computer networks, have to be exposed to one or more networks with a multitude of users, the latter partly unknown to the owner of the application objects or being potentially vicious or fraudulent.

In networked computer environments, application program systems are increasingly realized as systems consisting of a multitude of networked objects, which are accessible through well defined operations. Frequently used terms related to this approach to build program systems are Web Applications, Distributed Objects, Components, and Net Objects. Typically, the users (human users as well as machine based entities acting under a certain identity) of such distributed program systems access the system over a network. For the user, using an application program that consists of several objects means accessing a multitude of objects in the course of each program system use. Examples of such objects are CORBA objects, remotely accessible Java objects, remotely accessible DCOM components, and the static or dynamically created HTML as well as WAP pages of Web Applications. The well defined operations are either operations explicitly defined for the object type in the interface definition language of the respective technology (CORBA, Java, DCOM) or are operations implicitly defined and implemented as a combination of a generic protocol method with well defined parameter types (Web Applications).

Each of the respective objects has a specific reference to be used to access it. Normally, the user does not yet have all the necessary references before starting to use the application. In the regular case, before use of the application he has obtained a single reference which refers to an object that serves as the starting point for using the application. He obtains the necessary references to access other objects in the course of the interactions with the application program system. A reference to an object to be accessed is usually delivered and received contained in the output produced by other application objects which have been accessed before. The output is received by the user in the form of Web pages or object output parameters.

A reference contains the information that is technically necessary for the user's computer system to establish a transport connection with the proper qualities (e.g., a TCP connection) to the respective object's computer system and the information that is necessary for the object's computer system to address the object within this computer system. The respective examples of references for the object technology examples given above are CORBA IORs, Java-RMI references, DCOM references, and URIs.

The objects to be accessed by the user in the course of the use of a program system are in many cases exclusively dedicated to this user. This may, for instance, serve for security separation and personalized behavior or personalized output generation of the respective objects. The objects may be dynamically created specifically for the respective user and the respective use and access (often called a session). The time of creation may vary; the respective object may be created before handing out its reference to the intended user (e.g., following the Factory pattern in CORBA applications, servlet instances for dynamically created HTLM). The references to such user and/or session dedicated objects are willingly handed out by the program system to the respective user only, in the understanding of the program system and its application programmer that they semantically represent not only a handle of the object for the user but also an implicit authorization.

Current networked objects technology does not provide the functionality of an efficient access control system that meets the requirements of implicit authorization as mentioned above. I.e. they do not check whether the reference to a certain object used by a certain user to access the object has been handed out by the owner of the accessed object to the accessing user or not. This means they do not enforce the access control needed for the secure realization of said implicit authorization. In these systems, fraudulent users can use intercepted, forged, or fabricated references to illegitimately access objects. Intercepting or forging references is often possible because of insecure communications links,. e.g., the Internet, used. Fabricating references is always possible since the references have standard formats and the contained values can easily be guessed.

Prior art access control technology does not support secured implicit authorization. This is due to the fact that secured implicit authorization is mainly appropriate for systems with many short-lived objects, whereas most research on access control concepts and technology so far centered around less dynamic populations of long-lived documents and computing resources.

However, today's network centered application program systems consisting of a multitude of networked objects (as they are becoming standard technology in the Internet) need an authorization and access control scheme that allows secured implicit authorization of network connected users through the export of object references as part of and controlled by the application logic.

Therefore it is the object of the invention to provide methods and systems for a secured implicit authorization, that enforces access control, so that illegitimate access is technically made impossible.

This object is achieved by the method of claim 1 and the system of claim 6. Advantageous embodiments of the method and systems are described in the dependant claims.

In the context of the present invention it is clear to a person skilled in the art that Initiator Domains may exist that comprise(s) single or multiple Initiator Hosts each one able to request services of one or more target hosts in a target domain, preferably to use networked application objects, using the methods or systems of the present invention.

The method embodiments of the present invention are implementable on computer systems. In a further embodiment, the present invention may be implemented as a computer program product for use with a computer system. Those skilled in the art should readily appreciate that programs defining the function of the present invention can be delivered to a computer in many forms; including, but not limited to:

information permanently stored on non-writable storage media, e.g. read only memory devices witin a computer such as ROM's or CD-ROM's readable by a computer I/O-device;

information, alterably stored on writable storage-media, e.g. floppy disks or hard disks;

information conveyed to a computer through communication media such as networks or telephone networks via modem.

It should be understood, therefore, that such media, when carrying computer readable instructions that direct the method functions of the present invention represent alternate embodiments of the present invention.

Yet a computer program product stored on a computer readable storage medium, comprising computer readable program code means for an ingress-session-based authorization and control method to control access from an initiator-host to on a target host comprising the steps of:

(i) receiving an access-request, preferably a request-message, originally coming from the initiator-host, that references an object on the target host to access, (ii) assigning the access-request to an ingress-session and selecting a session-context belonging to that ingress-session, (iii) checking whether the access to the referenced object is authorized in the selected session-contextor not, and (iv) denying the access to the referenced object if the access to said object on the target host is not authorized in the selected session-context, (v) granting the access to the referenced object if the access to said object on the target host is allowed in the selected session-context wherein references to objectson the target host were handed over to the initiator-host as a response to an access-request already granted and wherein the object the reference is handed over for is authorized for access under the handed over reference in that session-context the already granted access-request is assigned to, is an another preferred embodiment of the present invention.

DISCLOSURE (SUMMARY) OF THE INVENTION

While the method and the principles discussed below relate to application program systems consisting of networked objects in general, for ease of description, the description of method and system here is directed to CORBA as an example technology for networked objects technologies. However, the skilled person will appreciate that the principles and method described are applicable to networked object systems in general, e.g., to Java-RMI, DCOM, and Web Applications involving static and dynamically created HTML pages.

As already mentioned above the goal of the present invention is to provide a secure method for the realization of implicit authorization for application program systems which consist of objects that are individually addressable by users and program systems over a network, such as the Internet.

In the present invention, implicit authorization is enabled in a practicable and enforceable way by applying the novel method of session based authorization, meaning that the act of handing out a reference to a networked object by the owner of the object to a user with a certain and verifiable identity (or an entity acting under such an identity) bears the explicit semantics that this user is authorized to access the object within the respective session, the session being a temporary relation between the user's system and the object owner's system where the identities of each other have been verified at establishment time and the authenticity of the session partners as well as of the messages exchanged is guaranteed through the use of technical means, such as the use of cryptographic means, according to the level of assurance required by the security policy of the object owner's system. The access control part of the method enforces that the object cannot be accessed outside the session in any way.

A core principle of the invention is that the authorization of a user to access the object is limited to interactions within the session within which the user has received the reference from the system of the owner of the object. In the regular, i.e., not further refined, case, the authorization becomes valid in the moment of receiving the reference and ends with the end of the session.

A supplementary, general object of the invention is to provide the means for refining each single automated session based authorization through further restriction by enforcing additional, more restrictive, security policy rules. This prevents unwanted authorization by program code in the protected networked objects, e.g., in the case of off-the-shelf software, and erroneous authorization, e.g., caused by programming errors in the application program code.

A more specific object of the invention is to provide the means to generally prevent non permitted authorization and thus unwanted access via the described system to certain networked objects specified by the security policy of the object owner's system.

A further object of the invention is to provide the means to generally prevent non permitted authorization of and thus access by certain users specified by the security policy of the object owner's system.

A further object of the invention is to provide the means to generally prevent authorization for and thus access to certain networked objects by certain users specified by the security policy of the object owner's system.

Another object of the invention is to provide the means for individualized authorization per object by restricting the authorization of the individual user to a subset of the object's operations which is defined individually for this user, the user groups he is a member of, or the security roles that are assigned to him by the security policy of the object owner's system.

Yet another object of the invention is to provide the means to constrain the authorization with regard to the maximum number of possible accesses per authorized operation on the object.

A further object of the invention is to provide the means to restrict the authorization with regard to validity time. This allows, alternatively to the session constraint principle, authorization with a fixed period of validity.

Another object of the invention is to provide the means for authorization described above, including authorization with restrictions as described above, for both, static objects as well as dynamically created objects.

A further object of the invention is to provide the means to specify the authorization, including the rules for refinement as described in the list of objects above, related to both, single instances of networked objects or the type of the object (respectively the interface exported by the object). The latter capability is particularly provided for security policy definitions for dynamically created objects.

Another object of the invention is to provide the means for mapping one or more external identities, such as Distinguished Names in public key certificates, to one internal identity which is the internal subject to authorization, thus supporting the integration with a multitude of user name schemes and systems.

Another object of the invention is to make sure that access control is always enforced according to the authorization before. All access attempts that have not been authorized before are denied. All restrictions of authorizations cannot be circumvented.

In a preferred embodiment the system implementing the method of the invention is characterized in that it is implemented as an application-level-interceptor, preferably a software module that is installed on a computer system, an application, preferably a software module, too comprising the referenced target, objects In a preferred embodiment the system implementing the method of the invention may be embodied as an application level interceptor directly at a server machine to protect individual applications such as by performing implicit authorization and access control when an access attempt is being made to any of the object-based resources.

The system implementing the method of the invention may be embodied as an application level gateway, preferably either a (single homed) host computer or a dual-homed host computer permanently connected to two networks, where the users reside in the first network and the networked objects to be protected by the system reside in the second network. The two networks are (at least logically) separated and the system according to the present invention being preferably the only gateway between the two networks. The system should be under the control of the owner of the objects to be protected.

A further object of the invention is to provide the means for bootstrapping the authorization and access control system described by providing the means to establish initial contact points for the application program systems.

In a preferred embodiment, the system provides the means to completely control the network traffic that passes through the system, thus not only providing an authorization and access control solution for the networked objects technology being used, but also providing a firewall solution for the respective networked objects technology, such as CORBA, DCOM, or Java-RMI, for the second network, with the same security level achieved as with traditional application-level gateway firewalls.

In another preferred embodiment of the present invention, the Message Origin Identification/Authentication subsystem, the Access Control Decision & Enforcement subsystem, the Implicit Authorization subsystem, and the Session Context Management subsystem may be tightly integrated with the implementation of a proxy server or CORBA IIOP bridge. In such an implementation, any state (e.g., proxified object references/proxified IORs) built up by the proxy server functionality in the course of handling accepted message data items in the context of a certain Ingress Session W may be hold as part of the Session Context (Session Context data item) SC-W associated with the Ingress Session W and may be deleted if that Session Context SC-W is deleted upon termination of the Ingress Session W.

Furthermore an application of the invention involves the Message Origin Identification/Authentication subsystem and the Session Context Management subsystem as a means for the lifecycle management of state (e.g., proxified object references/proxified IORs) typically building up in proxy servers or CORBA IIOP bridges. Using the described mechanisms, any additional state built up within the proxy server in the course of handling a given message will be associated with exactly that Session Context SC-W the received message has been assigned to by the Message Origin Identification/Authentication subsystem in co-operation with the Session Context Management subsystem. This state will be deleted and any resources needed to hold this state will be freed at the moment when the Session Context Management subsystem decides to delete that Session Context SC-W.

An encompassing method, system, and technology for implicit authorization and access control is given by the present invention. Implicit authorization shall mean that the intended receiver of an object reference is entitled to access the referenced object. Only users that have indeed received a reference to an object from the owner of this object are entitled to access this object. All attempts by others to access the object would have to be prevented by an access control system run by or run for the owner of the object. The access control system would have to be integrated with the computer system in which the object resides in a way that access attempts cannot bypass the access control system.

Technology for implicit authorization, provided by the present invention, supports the cost effective realization and operation of secure networked applications. It is a building block for Internet applications, particularly business-to-business program systems. One of its main benefits is the drastic decrease of complexity of the necessary authorization and access control management activities for the program systems. Implicit authorization allows to use an external access control system for an existing application program system, thus avoiding to implement access control within the application processes, without having to understand and remodel the application's logic in the form of externally defined and configured complete, and detailed formalized access rights.

The present invention is required in such application areas as:
  providing access control for dynamically created targets (e.g., servlet sessions or EJB sessions representing shopping carts) thereby preventing one user from accessing another user's session;
  providing access control for access requests from anonymous Initiators;
  providing convenient access control decision and enforcement to HTTP origin server's static and dynamic web pages by intermediate gateway machines.

Examples of embodiments of the invention are illustrated in the drawings.

FIGS. 1a to 1c are block diagrams showing at a conceptual level the process of session-based implicit authorization and access control by means of three examples.

FIG. 5a and 5b are flow charts showing the processing of TCP segment(s) or datagram(s) inside the Message Origin Identification/Authentication subsystem.

FIG. 6a and 6b are flow charts showing the processing of data items inside the Access Control Decision & Enforcement subsystem.

FIG. 7a and 7b are flow charts showing the processing of data items inside the Implicit Authorization subsystem.

FIG. 8 is a block diagram that shows the general structure of a Session Context Data Item (Session Context).

FIG. 9 is a flow chart showing the processing inside the Session Context Management subsystem when handling 'SELECT-CONTEXT' requests from the Message Origin Identification/Authentication subsystem.

Figure 2:
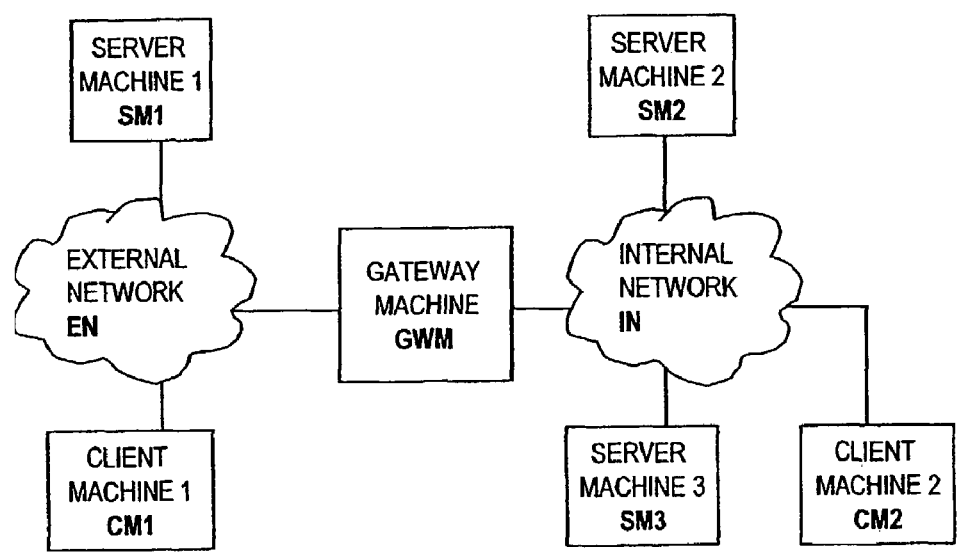
FIG. 2 is a block diagram showing an example of a network topology.

The following section describes the best mode for carrying out the present invention and its industrial applicability.

Distributed Systems to Which the Present Invention is Applicable

The present invention, a method and system for implicit authorization and access control, is generally applicable to distributed processing systems comprising multiple application processes located at multiple hosts that interact using any request-response type of protocol such as remote procedure call (RPC) protocols, remote object invocations protocols, or any other application-level protocol for access to remote application resources (e.g., static or dynamically created content) where the service to be requested by the protocol or the target to be addressed by the protocol is 'object-based' in that multiple services or targets on the same host or different hosts can be distinguished and separately addressed by object references or URIs.

In the sequel, these systems are simply called distributed systems. The objects or resources being accessible via those application-level protocols could be CORBA objects, Java objects, DCOM objects, or any static or dynamically created HTML, XML, or WML content. Examples of RPC protocols, remote object invocation protocols, or resource transfer protocols used by those distributed systems to which the present invention is applicable are:

the CORBA Internet Inter-ORB Protocol (IIOP) defined by the Object Management Group, Microsoft's Distributed Component Object Model protocol DCOM, the native Java remote object invocation protocol used by Java Remote Method Invocation (RMI) which is sometimes called Java Remote Method Protocol (JRMP), the CORBA Internet Inter-ORB Protocol (IIOP) used by Java RMI as an alternative to the above mentioned native Java remote object invocation protocol (this alternative is sometimes called Java IDL or Java RMI over IIOP), the Hypertext Transfer Protocol (HTTP) used for the transfer of HTML-encoded content and/or other MIME-typed content, any Extensible Markup Language (XML)-based RPC or remote object invocation protocols using HTTP as the base transport with standard HTTP messages (e.g., HTTP POST requests and standard HTTP responses to successful POST requests) encapsulating XML-based encoding of RPCs, object invocation request, or response messages. An example of such protocols is the Simple Object Access Protocol (SOAP), the Wireless Application Protocol (WAP) supporting application-level interactions and content exchange using standard content encoding such as Wireless Markup Language (WML) encoded content, WAP Binary XML Format encoded content, textual Wireless Markup Language Scripts (WMLScript), or bytecode encoding of compiled WMLScript exchanged via the Wireless Session Protocol (WSP) and appropriate lower-layer protocols, or any combinations of the above listed protocols and evolving future versions thereof.

It will be appreciated that the skilled person would be capable of adopting the design of the present invention to any other distributed system involving an RPC protocol or remote object invocation protocol that is characterized as follows:

Typically in those distributed systems, an application process in the client role (to be called "client" in the sequel) sends a request-type message (called "request message" in the sequel) to another application process in the server role (called "server" in the sequel) in order to either invoke a method or call a remote procedure at a target object hosted by that server, or to retrieve or manipulate a target resource such as a content resource at an HTTP or WAP origin server. In order to address that target object or resource, the client uses the target object's or resource's specific reference or handle which could be, for instance, a CORBA Interoperable Object Reference IOR), a DCOM object reference, a Java RMI remote (object) reference, or a Uniform Resource Identifier (URI), the latter used to reference objects or resources in basically any of the above listed request-response-based protocols or remote object invocation protocols. Such an object reference or URI (may be in conjunction with other addressing information) enables the client to contact the server machine and to specify the particular object or resource on the server machine which should be the target of the request message by including the complete or a part of the object reference or URI in the request message's header or in the parameter section of the message. Upon processing the received request message, the server may return a response-type message (called "response message" in the sequel) to the client containing out parameters, return values, error indicators, or the requested content which has been named by the URI.

Typically in the course of interactions between clients and servers of those distributed systems, the clients may be provided with new object references or URIs referring to further objects or resources. Those object references or URIs referring to further objects or resources may be exchanged as part of a message header, as part of a message body, as a parameter, as a return value, or as part of an error indication sent from the server to the client using one of the above described protocols.

Session Based Implicit Authorisation

The present invention provides a system and process that decides upon and enforces access control according to an implicit authorization policy that associates the handing out of a Target's object reference or URI from a Target Domain to an Initiator within an Initiator Domain with granting any Initiator within this Initiator Domain the right to access this Target. Here, a Target Domain is the set of Targets (objects or resources) in a single application process or a set of application processes on a single host or on multiple hosts that is uniformly protected with respect to access control by means of the present invention. An Initiator Domain is to be understood as an application process or a set of application processes external to the Target Domain running on a single host or on multiple hosts with each of those application processes when originating an access request to a Target within the Target Domain being uniformly handled as the same Initiator with respect to access control decisions by the means of the present invention.

The underlying assumption being made is that very often, the intention of the application programmer is to implicitly authorize a peer application process (i.e., Initiator) to access a given object or resource (i.e., Target) by passing that Target's object reference or URI in an application-level message to that Initiator.

The present invention combines a means for authorization that acts according to the above mentioned implicit authorization policy with an access control means enforcing this authorization by filtering out requests for access to a resource or object accordingly: by means of the present invention, any Initiator within a given Initiator Domain can access only those Targets within the Target Domain for which it has been implicitly or explicitly authorized to do so. The combination of a means for implicit authorization in conjunction with an effective and reliable means for enforcing this authorization (i.e., blocking of unauthorized access attempts) is the novel part to be achieved by the present invention.

Sessions

Implicit authorization is based on the concept of an Ingress Session defining a common context temporarily established for a series of distinct messages exchanged between application processes of an Initiator Domain and application processes of the Target Domain for the purpose of setting the limits of the validity of implicit authorizations. All those messages that are assumed or have been verified as originating from the same conceptual source or any source operating under the same authenticated identifier or that have been sent from the Target Domain back to that same conceptual source within some temporal constraints are considered to belong to the same Ingress Session. This conceptual source, which will be called Initiator Domain in the sequel, could be a single application process or set of application processes running on a single or on multiple hosts.

The assignment of a given message being exchanged between Initiator Domain and Target Domain to an existing or newly established Ingress Session by the means of the present invention can be based on a variety of criteria related to the conceptual source of the given message as appropriate for a given field of application. For example, the assignment can be based on:

- the outcome of security transformations indicating what Security Association governed the cryptographic transformation of the message to be assigned, or
- the Security Association identifier (such as, for instance, the Session Identifier of the SSL, TLS, or WTLS protocols) bound by some means to the message, or
- the authenticated identifier (if available) of the peer application process (e.g., principal identifier) in the Initiator Domain bound by some means to the message, or
- the IP address of the peer system, or
- any type of security token (e.g., a secret generated by the Initiator and subsequently encrypted in the Initiator Domain with the public key of the Target Domain and passed for some period of time with any request-type message originating from the Initiator Domain [This secret may be passed among applications and hosts within an Initiator Domain resulting in the implicit authorization being or becoming effective for any of those applications and hosts. Furthermore, it may be passed among Target Domains that cooperate in that when a first Target Domain passes a reference or URI for a Target in a second, cooperating Target Domain to an Initiator (or any application in an Initiator Domain) that Initiator will be implicitly authorized to access that Target in the second Target Domain. In this context, cooperation among Target Domains implies selectively exchanging session context-specific state among Target Domains.]), or
- any type of digital signature assigned to request-type messages by means of cryptographic processes, or
- any combinations thereof.

An Ingress Session may be initiated by any application process with the first message being sent towards the Target Domain. It exists for some period of time until it is terminated by any precisely defined event (as appropriate to the special field of application) such as for instance:

- idle timer expires (because of no message having been exchanged for some specified period of time in the context of a given Ingress Session),
- the receipt of a certain, specified request message in the context of a given Ingress Session,
- the receipt of a reply message to a certain, specified request message received in the context of a given Ingress Session,
- the receipt of a special control or management message, or any combinations thereof.

The lifecycle of an Ingress Session is not necessarily tied to any underlying transport connection but may be tied, for example, to the lifecycle of a security association established by such transport layer security protocols as Secure Sockets Layer (SSL) protocol, the Transport Layer Security TLS) protocol, or the Wireless Transport Layer Security (WTLS) protocol which could encompass multiple separate underlying transport connections.

In the case of security associations involving the authentication of the peer entity within the Initiator Domain, the lifecycle of a given Ingress Session does not necessarily have to be tied to any given security association but rather may encompass multiple security associations established with or by the same authenticated principal identifier.

Ingress Sessions & Implicit Authorization

The novel process of session based implicit authorization interprets the fact that an application process within the Target Domain has handed out a Target's object reference or URI within a given Ingress Session to a further application process within an Initiator Domain as an implicit authorization for that Initiator Domain to access or retrieve that Target (which could be any remotely accessible object or resource) within the respective Ingress Session.

Referring to FIG. 1a, this process is clarified by an example depicted at a conceptual level in which the Initiator Domain W comprises an Initiator Host IH that issues a request-type message M1 towards a target Target1 on a Target Host TH inside the Target Domain TD with this message being intercepted by means of the present invention. Based on data related to the origin of the received request-type message M1 or originator-supplied data associated with this request-type message M1, an Ingress Session is assigned to this request-type message M1 and the proper Session Context SC-W corresponding to this Ingress Session selected REQ1. This is preferably done by a Message Origin Identification/Authentication subsystem MO. After having been assigned to the selected Session Context SC-W, the request-type message M1 is forwarded via an Access Control Decision and Enforcement means AC which is assumed to grant access for this request based on a check REQ2 of the Session Context SC-W to the addressed Target1. The response-type message M10 generated by Target1 in reply to the received request M1 is assumed to contain a reference or URI to a further Target2 on the Target Host TH in the Target Domain TD with this message again being intercepted by means of the present invention, preferably an Implicit Authorization Subsystem IA. The fact that a reference or URI to a further Target2 has been passed in the message is detected and interpreted as an implicit authorization to access Target2 within the given Ingress Session. This implicit authorization is 'recorded' (MODIFY CONTEXT) REQ3 in Session Context SC-W before the response-type message M10 is passed on to the Initiator Host IH on the Initiator Domain W.

Subsequently, during the lifetime of the same Ingress Session the Access Control Decision and Enforcement means AC of the present invention will consider this implicit authorization and perform the access control decision and enforcement function accordingly, that is, enable access to those Targets Target1, Target2 that have been implicitly authorized within that very Ingress Session and which access request message has been exchanged in the context of that Ingress Session. This is depicted by an example shown at a conceptual level in FIG. 1b.

Referring to FIG. 1b, the Initiator Host IH inside the Initiator Domain W is assumed to issue a second request-type message, this time towards target Target2 on Target Host TH inside the Target Domain TD with this message being intercepted by the process of the present invention in the following way: Again, based on data related to the origin of the received request-type message M1 or originator-supplied data associated with this request-type message M1, an Ingress Session is assigned to this request-type message M1 and the proper Session Context SC-W corresponding to this Ingress Session is selected REQ1. Then the request-type message M1 is forwarded to the Access Control Decision and Enforcement means AC which checks the assigned Session Context SC-W for any implicit authorization to access Target2. Since Session Context SC-W has been modified before REQ3 of FIG. 1a to reflect this particular implicit authorization, access is granted and the request-type message M1 is passed on to Target2 on Target Host TH in the Target Domain TD. The response-type message M10 generated by Target2 in reply to this request-type message M1 is passed back towards the Initiator Host IH inside the Initiator Domain W intercepted by the means of the present invention. This time, the response-type message M10 is not assumed to contain any reference or URI. Thus, the message is passed on to the Initiator Host IH on the Initiator Domain W on without a modification of any Session Context.

Attempts made by any application processes in some Initiator Domain to access a particular target Target1, Target2 on the Target Host TH inside the Target Domain TD without having received that Target's Target1, Target2 reference or URI within the context of the same Ingress Session will effectively be blocked by the means described in the present invention. In particular, any attempt made by any application processes in some Initiator Domain to access within the context of a given Ingress Session a particular target Target1, Target2 which object reference or URI has been handed out by the Target Domain TD on the Target Host TH within a further concurrently existing Ingress Session (and therefore to a further application process within a further Initiator Domain) while it has not been handed out within the given Ingress Session will be defeated by blocking such a request. This is depicted by an example shown at a conceptual level in FIG. 1c.

Referring to FIG. 1c, an Initiator from a further Initiator Domain Y on a further Initiator Host IH, issues a request-type message M1 towards target Target2 on the Target Host TH inside the Target Domain TD with this message being intercepted by the process of the present invention in the following way:

Based on data related to the origin of the received request-type message M1 or originator-supplied data associated with this request-type message M1, an existing or newly established Ingress Session is assigned to this request-type message M1 and the proper Session Context corresponding to this Ingress Session is selected REQ1 which is assumed to be Session Context SC-Y (since we have a different Initiator Domain Y and thus a separate Ingress Session for this Initiator).

Next, the request-type message M1 is forwarded to the Access Control Decision and Enforcement means AC which checks REQ2 the assigned Session Context SC-Y for any implicit authorization to access Target2. Since Session Context Y SC-Y is a Session Context different from Session Context W SC-W of FIGS. 1a, 1b with only the latter containing the record for the Implicit Authorization for target Target2, the check REQ2 of Session Context SC-Y for access to target Target2 will result in a denial of access.

Furthermore, attempts made by any application processes in some Initiator Domain to access a particular target Target1, Target2 outside the context established by any Ingress Session generally will be denied by blocking such requests. This will be enforced by the network architecture itself which must assure that any message exchange-related traffic is funneled through the controlling process of an embodiment of the present invention with the forwarding of the request within the controlling process of an embodiment of the present invention depending on the existence of a proper context and implicit or explicit authorization.

In order to provide a bootstrapping means, an exception must be made to the rule described above: entities may be explicitly authorized (independent of any Ingress Session) to access certain targets Target1, Target2 within some application processes of the Target Domain TD. The access control check performed by the Access Control Decision and Enforcement means AC in the example shown in FIG. 1a could have been granted based on an explicit authorization specified in some access control policy, in which case a check REQ2 of the Session Context SC-W, as shown in FIG. 1a, would not have been necessary.

Targets of this type are the only Targets to be accessed when initiating an Ingress Session from an Initiator Domain. Any interactions with those Targets may lead to the handing out of further object references or URIs.

Mode of Applicability

The system and process of the present invention is applicable as an add-on functionality to any of the above described distributed systems by intercepting the transfer of any request and reply messages between application processes within the Initiator Domain and application processes within the Target Domain with the latter being protected by the system and process of the present invention. Generally, those e request and reply messages could be intercepted and processed either at a central strategic point within the network which cannot be bypassed (i.e., interposed access control realized within a gateway machine) or within each server machine to be individually protected in this way by incoming access control. An example network topology and distributed system is shown in FIGS. 2 and 3 and described in the sequel.

Preferred Embodiment of the Present Invention

In the sequel, the preferred embodiments of the present invention as (i) an application level gateway and as (ii) an application level interceptor will be described.

Figure 3:
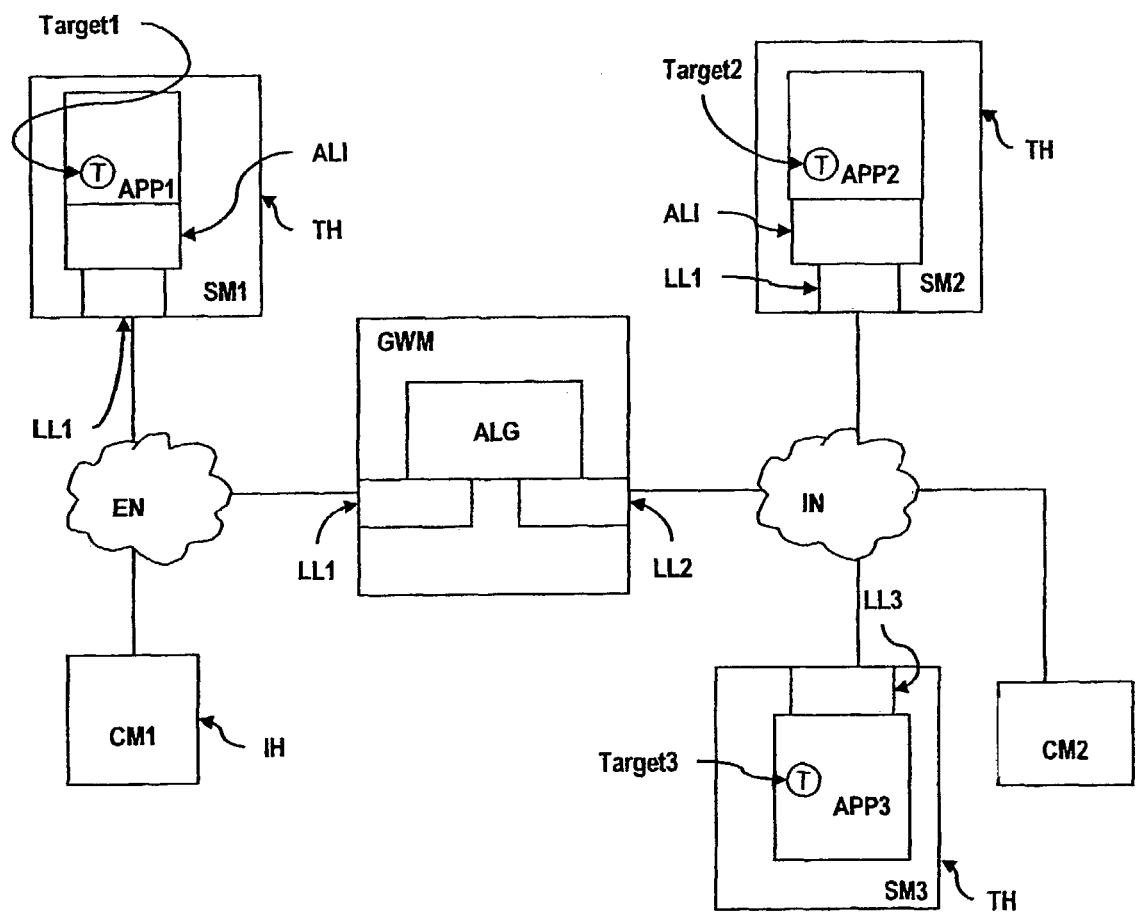
FIG. 3 is a block diagram showing a security system of the present invention applied at various points to the example network topology of FIG. 2.

Referring to FIG. 2, an example network topology is shown. In this example, a gateway machine GWM is shown connecting two otherwise completely separated networks: an internal network IN which is logically connected only by the gateway machine GWM to an external network EN.

A client machine 1 CM1 connected to the external network EN may send request-type application-level protocol elements to the server machine 1 SM1 and may receive response-type application-level protocol elements from the server machine 1 SM1. Alternatively, client machine 1 CM1 may exchange application-level protocol elements via the gateway machine with any server machine connected to the internal network such as server machine 2 SM2 or server machine 3 SM3. Another client machine 2 CM2 being connected directly to the internal network IN may exchange application-level protocol elements directly with the server machine 2 SM2 or server machine 3 SM3 without having to pass the gateway machine GWM.

The particular configuration shown in FIG. 2 has been provided as an example only and is not meant to limit the type of network or the configuration to which the present invention can be applied. For instance, packet filtering (i.e., screening) routers (not shown in FIG. 2) may exist on the route between the external network EN and gateway machine GWM (i.e., exterior router) and between internal network IN and, gateway machine GWM (i.e., interior router) blocking direct network level traffic between external network EN and internal network IN. Without such screening routers the gateway machine GMW must be build as a dual-homed host that does not route packets. Generally, the gateway machine GWM may take the position of a proxy server in any of the firewall architectures shown in Chapman (Chapman, D., Zwicky, E. "Building Internet Firewalls", O'Reilly & Assoc. Inc., 1995) such as the dual-homed host architecture, the screened host architecture, the screened subnet architecture and their variations such as a merged interior and exterior router supporting a perimeter network to which the gateway machine GWM is attached via a separate dedicated network interface. In any of these cases where the gateway machine GWM takes the position of a proxy server, the configuration of the adjacent (maybe packet filtering) routers must guarantee that any network-level traffic from the external network EN to the internal network IN or vice versa would have to traverse the gateway machine GWM. Generally, the network topology of the internal network IN including the gateway machine GWM should be formed in a way isolating the internal network IN so that there is only a single point of connection to the external network EN or to other outside networks which passes through the gateway machine GWM. This topology enforces a necessary restriction that any network communication between the internal network IN and the external network EN must in all cases pass through a single point of control, that is, through the gateway machine GWM.

FIG. 3 shows the example network topology of FIG. 2, in which the present invention has been installed. Elements also shown in FIG. 2 are depicted with the same reference numerals. While the description presented here is directed towards a simple unidirectional case with a client machine at the external network trying to access an application on a server machine at the internal network the present invention is also applicable to more complex scenarios with applications performing both the client as well as a server role.

Basically, the internal network IN in FIG. 3 is separated and protected from the external network EN by a gateway machine GWM constructed according to the present invention. It is assumed that there is no other route between the internal network IN and the external network EN besides the gateway machine GWM. The gateway machine GWM operating in the role of an application-level gateway (also called proxy server) authorizes and controls access from client machines at the external network EN to any resources or objects provided by application APP2, APP3 at the internal network IN. In the sequel, these resources or objects (which could be, for instance, CORBA objects, Java objects, DCOM objects, or any static or dynamically created HTML, XML, or WML content) will generally be called Targets and depicted in FIG. 3 as Target1, Target2, or Target3.

More specifically, within the gateway machine GWM an application level gateway ALG built according to the present invention provides the means for implicit authorization and access control. The application level gateway ALG consumes from the first Lower Layer Protocol Stack LL1 request-type application-level protocol elements received from a client machine 1 CM1 at the external network EN and processes those protocol elements according to the present invention which encompasses the execution of access control with the latter resulting in one of the two: (i) the processed request-type application-level protocol element will be passed on to the second Lower Layer Protocol Stack LL2 for relaying it to the Target maintained by one of the applications APP2, APP3 on the server machines 2 or 3 SM2, SM3 within the internal network IN (i.e., access has been granted)—or—(ii) the received application-level protocol element will be blocked and skipped either in conjunction with or without generating a new response-type application-level protocol element to be passed on to the first Lower Layer Protocol Stack LL1 in order to be returned to the original requester at the client machine 1 CM1 in the external network EN (access has been denied). In the case the application level gateway ALG consumes from the second Lower Layer Protocol Stack LL2 response-type application-level protocol elements originating from any of the applications 2 or 3 APP2, APP3 on the server machines 2 or 3 SM2, SM3 within the internal network IN, those application-level protocol elements will be processed according to the present invention which may encompass an implicit authorization procedure with respect to further object-based resources (i.e., Targets).

As shown in FIG. 3, the present invention may not only be embodied as an application-level gateway at a gateway machine GWM (this is the preferred embodiment as an application level gateway described in the sequel)—but alternatively—may be embodied as an application level interceptor ALI directly at a server machine SM1, SM2 to protect individual applications APP1, APP2 by performing implicit authorization and access control when an access attempt is being made to any of the application's APP1, APP2 object-based resources (i.e., targets Target1, Target2). In this embodiment, request-type and response-type application-level protocol elements sent and received via the Lower Layer Protocol Stack LL1 will be handled by the application level interceptor ALI in a way similar to the processing done by ALG.

As shown in FIG. 3, the gateway machine GWM controls access from any client at the external network EN such as client machine 1 CM1 working as Initiator Host IH to any object-based resource (i.e., targets Target2, Target3) within the application APP2, APP3 on server machine 2 or 3 SM2, SM3 working as Target Host TH each. In addition the application 2 APP2 on the server machine 2 SM2 is protected by another embodiment of the present invention (i.e. application level interceptor ALI which allows to control access from any internal client at the internal network IN such as client machine 2 CM2 to any object-based resource within application 2 APP2 such as Target2. Similarly, the application 1 APP1 on the server machine 1 SM1 working as Target Host TH, too which is directly connected to the external network EN is protected by the same embodiment of the present invention (i.e. application level interceptor ALI) which allows to control access from any external client at the external network EN such as client machine 1 CM1 to any object-based resource within application 1 APP1 such as Target1. Such a server machine SM1 working as another Target Host TH could be, for instance, a web server within a screened subnet or perimeter network which is directly accessible to the public Internet.

The Lower Layer Protocol Stacks LL1, LL2 may implement any IP-based transport layer protocol such as TCP/IP or UDP/IP with or without transport-layer encryption such as SSL or TLS or other transport-layer protocols such as Wireless Datagram Protocol (WDP) with or without Wireless Transport Layer Security (WTLS) as defined by the WAP Forum or combinations thereof such as WTLS on top of UDP/IP. Note, these protocol stacks are mentioned as examples only and are not meant to limit the type of transport layer protocol to which the present invention can be applied. In the case of connection-oriented transport layer protocols, the, Lower Layer Protocol Stacks would also handle the accepting and/or establishing of transport layer connections as typically done by any client or server applications. Within the gateway machine GWM, both Lower Layer Protocol Stacks LL1, LL2 may use the same implementation or different implementations controlling a single or multiple network interface cards.

In the sequel, the terms 'Application Layer' and 'Transport Layer' are used herein with the meaning as defined by the Internet protocol suite. A mapping of the description of the present invention to an OSI layer protocol stack can be easily achieved as is well known to those skilled in the art.

Embodiment as Application Level Gateway

Figure 4A:
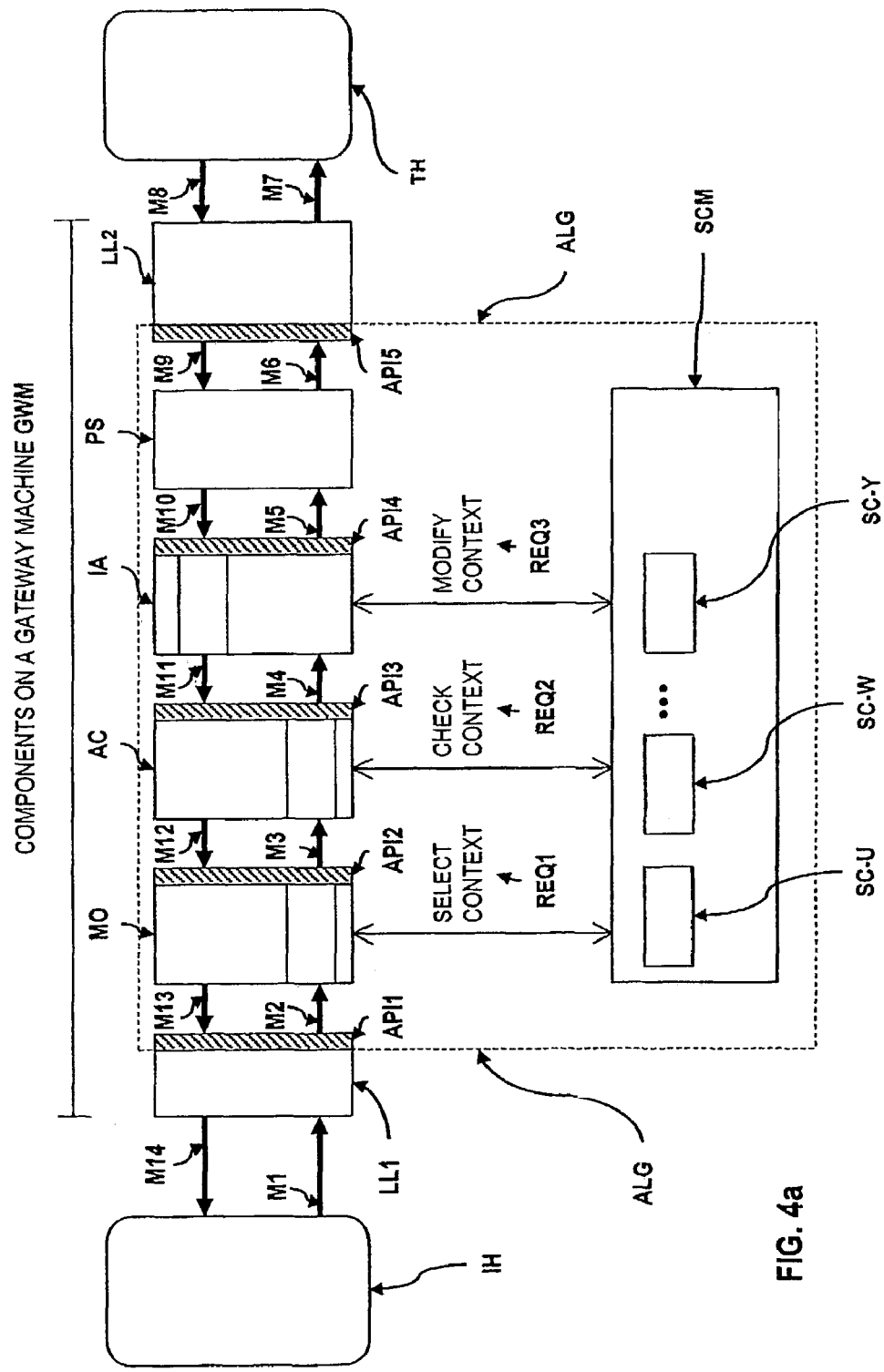
FIG. 4a is a block diagram depicting an embodiment of the present invention as an application-level gateway residing at a gateway machine.

Referring to FIG. 4a, a block diagram of an embodiment of the present invention as an application-level gateway ALG built into a gateway machine (such as GWM depicted in FIG. 3) is shown. An application-level gateway is a program that accepts requests from one network and fulfills requests using another network. It may consult a database of destinations to make a decision where to send a message. Generally, a translation of a message (e.g., reformatting of its message header) is required when forwarding a message through an application gateway or proxy from one network to another.

While the principles of the present invention as being discussed below relate to object-based systems (as characterized above) in general, for ease of description only, the description is very often directed to the specific case of a gateway machine running a CORBA bridge for the IIOP protocol which is enhanced according to the present invention with respect to support for implicit authorization and access control for CORBA-based distributed systems. The skilled person will appreciate, however, that the principles are more widely applicable, for example to any distributed systems based on such protocols as, for instance, Java RMI, DCOM, HTTP/HTML, HTTP/XML, SOAP, or WAP/WML.

The present invention as depicted in FIG. 4a is described as a number of subsystems (depicted as blocks in a block diagram) that may be executed in a single or multiple processes on a single or on multiple hosts. Grouping of the processes of the present invention into subsystems is only exemplary for the purpose of illustration—other examples of distribution, aggregation, or further decomposition of the described subsystems or even replication or duplication may be possible. Furthermore, any of the processes described in the sequel may be optimized by applying caching resulting in certain steps becoming redundant or moved to different subsystems which is not described here for the sake of clarity.

FIG. 4a illustrates an Initiator Host IH (such as the client machine 1 CM1 of FIG. 2) assumed to be located in an external network (such as the external network EN of FIG. 2) that interacts via an Application Level Gateway ALG on a Gateway Machine GWM with a Target Host TH residing in the internal network (such as the internal network IN of FIG. 2). The interactions of the Application Level Gateway ALG with Initiator Host IH on the external network are handled at the gateway machine GWM by the Lower Layer Protocol Stack LL1 while the interactions of the Application Level Gateway ALG with the Target Host TH on the internal network are handled at the Gateway Machine GWM by the Lower Layer Protocol Stack LL2. Both Lower Layer Protocol Stacks LL1, LL2 handle the processing of the transport layer protocol during the exchange of TCP segments or datagrams with the Initiator Host IH or the Targe Host TH. Furthermore, any one of the two Lower Layer Protocol Stacks LL1, LL2 may handle the processing related to transport layer security (such as, for example, SSL, TLS, or WTLS) if encrypted TCP segments or datagrams are to be exchanged.

The Application Level Gateway ALG is depicted to comprise a number of software subsystems (a Message Origin Identification/Authentication subsystem MO, an Access Control Decision & Enforcement subsystem AC, an Implicit Authorization subsystem IA, a Proxy Server subsystem PS, and a Session Context Management subsystem SCM) that interact with each other and with the two Lower Layer Protocol Stacks LL1, LL2 by passing data items via socket-like application programming interface API1, API2, API3, API4, API5.

A request-type message M1 sent by the Initiator Host IH to the Application Level Gateway ALG is accepted by the Lower Layer Protocol Stack LL1 (where optionally some security transformations according to the applied transport layer security protocol) may be applied) and passed on via application programming interface API1 as a (non-encrypted) data item M2 in conjunction with a descriptor D (denoting either a connection or a socket pair associated with this data item) to the Message Origin Identification/Authentication subsystem MO. Furthermore, some type of origin related information associated in some way to the descriptor D such as for instance, the peer's IP address or the Session ID of the transport layer security protocol is gathered by Lower Layer Protocol Stack LL1 and made available at application programming interface API1.

The descriptor value D assigned by Lower Layer Protocol Stack LL1 or Lower Layer Protocol Stack LL2 either to an accepted transport-layer connection (in the case TCP/IP or any other connection-oriented transport layer protocol is used), or to a secure connection (in the case transport-layer security such as SSL/TLS/WTLS is used), or simply to the two communication endpoints (i.e., sockets) of the datagram(s) being exchanged (in the case UDP/IP or WDP is used) serves throughout the complete chain of interaction from Lower Layer Protocol Stack LL1 to Lower Layer Protocol Stack LL2 as a means for denoting the peer's (e.g. Initiator Host IH or Target Host TH) communication endpoint (or if existing, a connection with this peer). The descriptor D assigned by Lower Layer Protocol Stack LL1 will subsequently be used by the subsystems AC, IA, PS to refer to the peer's communication endpoint.

The Message Origin Identification/Authentication subsystem MO obtains the data item M2 via application programming interface API1 from Lower Layer Protocol Stack LL1 and retrieves (using descriptor D associated with the obtained data item M2 at application programming interface API1) any origin-related information (ORI) available for the obtained data item.

Once when a new connection has been accepted (in the case a connection-oriented transport protocol is used—otherwise, once for each datagram being accepted), the Message Origin Identification/Authentication subsystem MO calls the Session Context Management subsystem SCM with a 'SELECT CONTEXT' request REQ1 asking the Session Context Management subsystem SCM to correlate that descriptor D with the help of origin-related information provided by the Message Origin Identification/Authentication subsystem MO with a proper Session Context to be selected or newly created if no proper Session Context already exists. In the sequel, this Session Context is called Session Context SC-W.

The Session Context Management subsystem SCM maintains the state of all (potentially concurrently existing) Ingress Sessions as a variable number of Session Context items SC-U, SC-W, SC-Y with each of these Session Context items SC-U, SC-W, SC-Y maintaining the state of a given Ingress Session which is called Session Context SC-U, SC-W, SC-Y. Thus, the Session Context SC-W comprising all the state for a given Ingress Session W is assumed to be maintained in the Session Context data item SC-W. The Session Context Management subsystem SCM manages the creation and deletion of any Session Context Data Items SC-U, SC-W, SC-Y with the latter being triggered by the expiration of an idle time or other events or explicit management interaction. The internal processing performed by the Session Context Management subsystem SCM subsystem is described in more detail in FIG. 9, FIG. 10, FIG. 11, FIG. 12, and FIG. 13 in the sequel.

When processing the 'SELECT CONTEXT' request REQ1 from Message Origin Identification/Authentication subsystem MO, the Session Context Management subsystem SCM compares the origin-related information provided by the Message Origin Identification/Authentication subsystem MO with this request with characteristic values maintained in its Session Context data items SC-U, SC-W, SC-Y and either selects the one that matches the provided origin-related information or creates a new one. In both cases the provided descriptor D will be stored as a temporary handle to the Session Context data item SC-U, SC-W, SC-Y being selected or created.

After the Session Context Management subsystem SCM returns control to the Message Origin Identification/Authentication subsystem MO, the Message Origin Identification/Authentication subsystem MO reassembles the data item M2 (or a sequence of data items M2 which contain transport layer segments or datagrams) into a data item M3 containing exactly one request-type or response-type message and passes data item M3 via application programming interface API2 in conjunction with the same descriptor D to the Access Control Decision & Enforcement subsystem AC. The processing performed by MO is described in more detail in FIG. 5a and FIG. 5b in the sequel).

The Access Control Decision & Enforcement subsystem AC (using via application programming interface API2) obtains the data item M3 containing a request-type or response-type message from to the Message Origin Identification/Authentication subsystem MO. A descriptor D is associated with the obtained data item M3 at application programming interface API2. The Access Control Decision & Enforcement subsystem AC passes any data items containing response-type messages directly on to the Implicit Authorization subsystem IA, while any data items containing request-type messages are subject to an access control decision and enforcement process as detailed in (FIG. 6a in the sequel). In the course of this processing, the Access Control Decision & Enforcement subsystem AC calls the Session Context Management subsystem SCM with a 'CHECK CONTEXT' request REQ2 asking the Session Context Management subsystem SCM to check the Session Context SC-W referred to by the registered descriptor D if the request being made by the means of the obtained data item M3 has been implicitly authorized before.

If the result of check REQ2 returned by the Session Context Management subsystem SCM indicates an implicit authorization has been found in the Session Context SC-U, SC-W, SC-Y referred to (that is, access is to be granted), the Access Control Decision & Enforcement subsystem AC passes a data item M4 containing the request-type message on via the application programming interface API3 to the Implicit Authorization subsystem IA. The same descriptor D being associated with the data item M3 at application programming interface API2 is associated with data item M4 at application programming interface API3.

If the result of check REQ2 returned by the Session Context Management subsystem SCM indicates an implicit authorization has not been found in the referred to the Session Context SC-U, SC-W, SC-Y (that is, access is to be denied), the Access Control Decision & Enforcement subsystem AC either simply discards the data item M3 without passing it on to the Implicit Authorization subsystem IA or it may generate a new data item containing an exception-type message to be returned to the Initiator Host IH.

The Implicit Authorization subsystem IA obtains from, the Access Control Decision & Enforcement subsystem AC (using the application programming interface API3) data items M4 containing request-type or response-type messages and passes those request-type as well as all response-type messages on via the application programming interface API4 to the Proxy Server subsystem PS as data items M5. The same descriptor D being associated with the data item M4 at the application programming interface API3 is associated with data item M5 at the application programming interface API4. The internal processing performed by the Implicit Authorization subsystem IA (which focusses on the data items, being accepted from the Proxy Server subsystem PS) is described in more detail in FIG. 7a and FIG. 7b in the sequel.

The Proxy Server subsystem PS provides a typical application level proxy server functionality such as an HTTP (reverse) proxy server or a CORBA IIOP bridge. The Proxy Server subsystem PS accepts data items M5 containing request-type or response-type messages from the Implicit Authorization subsystem IA using the application programming interface API4 and passes those request-type and response-type messages (after some processing required for achieving a proxy server functionality) as data items M6 on to the Lower Layer Protocol Stack LL2 using application programming interface API5 of Lower Layer Protocol Stack LL2 in order for the request-type or response-type messages being delivered as data item M7 to the Target Host TH.

Response-type messages M8 delivered from the Target Host TH to the Lower Layer Protocol Stack LL2 will be obtained by the Proxy Server subsystem PS as data item M9 from Lower Layer Protocol Stack LL2 be forwarded as a newly generated data item M10 to the Implicit Authorization subsystem IA using the application programming interface API4 supported at the Implicit Authorization subsystem IA. Request-type messages accepted at Lower Layer Protocol Stack LL2 from Target Host TH may be forwarded (after standard proxy server-like processing at the Proxy Server subsystem PS) directly to the Lower Layer Protocol Stack LL1 to be delivered to the respective (e.g., callback) interface at the Initiator Host IH. Their processing is not subject to the present invention. Generally, the processing to be performed by the Proxy Server subsystem PS can be realized by means of current technology as is well known to those skilled in the art and will thus not be described in detail.

After accepting a data item M10 with a response-type or request-type message at application programming interface API4 from the Proxy Server subsystem PS, the Implicit Authorization subsystem IA processes the data item M10 as detailed in FIG. 7b, in order to search for any object reference(s) or URI(s) found either as parameters of data item M10 or in the body of data item M10. If any object reference(s) or URI(s) are found, the Implicit Authorization subsystem IA calls the Session Context Management subsystem SCM with a 'MODIFY CONTEXT' request REQ3 asking the Session Context Management subsystem SCM to register the object reference(s) or URI(s) found in the response-type message M10. This registration results in the Session Context referred to by the descriptor D associated with the obtained data item M10 at application programming interface API4 being modified to store the additional reference(s) or URI(s).

Then, using the application programming interface API3 the request-type or response-type message will be passed on from the Implicit Authorization subsystem IA as data item M11 to the Access Control Decision & Enforcement subsystem AC (using the application programming interface API3), from the Access Control Decision & Enforcement subsystem AC as data item M12 to the Message Origin Identification/Authentication subsystem MO (using the application programming interface API2), from the Message Origin Identification/Authentication subsystem MO as data item M13 to Lower Layer Protocol Stack LL1 (using application programming interface API1), in order to be delivered to the Initiator Host IH.

The internal processing performed by the subsystem AC and the, subsystem MO is described in more detail in FIG. 5a, FIG. 5b, FIG. 6a, and FIG. 6b in the sequel.

In the case, the Initiator Host IH also supports callbacks (i.e., the Initiator Host IH acts itself as a server for some target resources) and the Target Host TH issues some request-type message to the Initiator Host IH, the interaction may not be affected by any of the subsystems Implicit Authorization subsystem IA, Access Control Decision & Enforcement subsystem AC, the Message Origin Identification/Authentication subsystem MO, or Session Context Management subsystem SCM. Rather, any data items related to those interaction may be simply passed through the subsystems Implicit Authorization subsystem IA, Access Control Decision & Enforcement subsystem AC, and the Message Origin Identification/Authentication subsystem MO. Those interactions are not subject to the present invention.

Embodiment as Application Level Interceptor

Figure 4B:
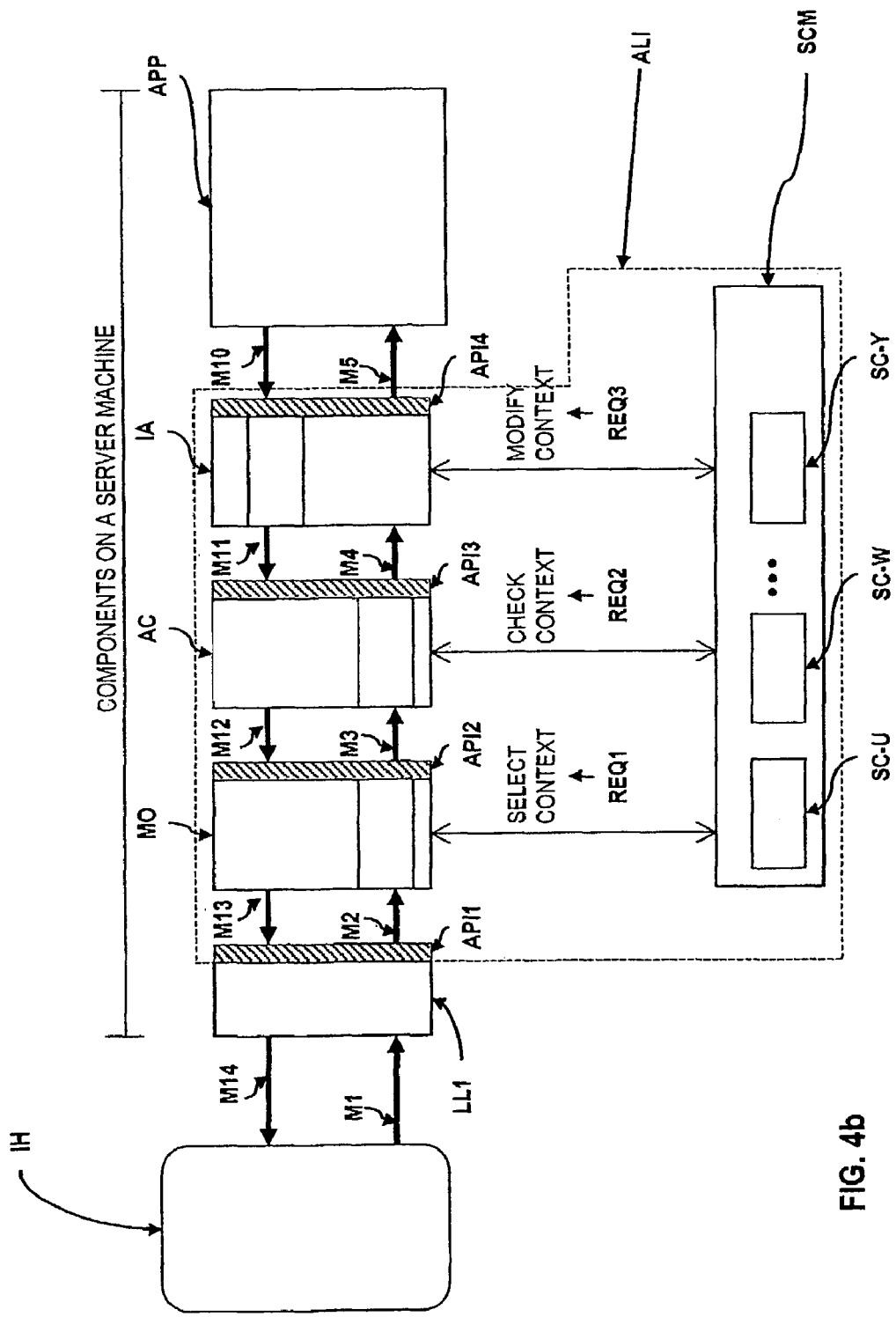
FIG. 4b is a block diagram depicting an embodiment of the present invention as an application-level interceptor on a server machine.

Referring to FIG. 4b, a block diagram of an embodiment of the present invention as an application-level interceptor ALI built directly into the server machine which runs the application to be protected (such as server machine SM1, SM2 depicted in FIG. 3) is shown.

In this figure the shown application-level interceptor ALI is placed in between the Application APP to be protected and the Lower Layer Protocol Stack LL1. Instead of interacting with a Proxy Server PS the above depicted Implicit Authorization IA subsystem directly interacts with the Application to be protected APP. Blocks shown with the same reference numerals as in FIG. 4a have identical processing and play the same role in the overall system. Since the embodiment as an application level interceptor is considered to be largely identical to the embodiment as an application level gateway shown in FIG. 4a, and the main differences being outlined above, the description of the preferred embodiment in greater detail concentrates on the (slightly more complicated) case of an embodiment as application level gateway.

In the sequel, each of the above mentioned subsystems will be described in more detail.

Lower Layer Protocol Stack

The Lower Layer Protocol Stacks LL1, LL2 are transport-layer protocol stacks that implement an IP-based transport layer protocol such as TCP/IP or UDP/IP or any other transport layer protocols such as the Wireless Datagram Protocol (WDP) of the Wireless Access Protocol (WAP). In the case of connection-oriented transport layer protocols being supported, the Lower Layer Protocol Stacks would also handle the accepting and/or establishing of transport layer connections as typically done by any client or server applications. If transport layer security is required (such as the Secure Socket Layer (SSL) protocol, the Transport Layer Security (TLS) protocol, or the Wireless Transport Layer Security (WTLS) protocol defined as part of the Wireless Access Protocol suite), that security layer is also implemented by the Lower Layer Protocol Stack. Note, these protocols are mentioned as examples only and not meant to limit the type of transport layer protocol or transport layer security protocol to which the present invention can be applied.

In the preferred embodiment, the Lower Layer Protocol Stacks LL1, LL2 offer a socket-like application programming interface (API) which generates and assigns a descriptor D for each TCP connection or SSL/TLS/WTLS secure connection it supports. In those cases where a connectionless protocol such as UDP/IP or WDP without transport layer security is used, the socket pair (i.e., the 4-tuple consisting of the Initiator's IP address, Initiator's port number, local IP address, and local port number) serves as a descriptor D at this API. Via this API offered to the subsystem MO, TCP segments or datagrams may be accepted from Initiators or sent to Initiators. Furthermore, origin-related information available at these Lower Layer Protocol Stacks such as:

SSL/TLS/WTLS session identifiers, or
authenticated peer identities as found in an SSL/TLS/WTLS client certificate, or
Initiator P addresses and used port numbers is made available at this API.

The descriptor D generated and assigned by the Lower Layer Protocol Stack LL1 may also be used at the subsystems' MO, AC, and IA socket-like APIs. At all these subsystems MO, AC, IA, D can be assumed to have a fixed relationship with a given socket pair assigned to one specific Initiator (i.e., the 4-tuple consisting of the Initiator's IP address, Initiator's port number, local IP address of the Gateway Machine, and local port number).

Within the gateway machine GWM, both Lower Layer Protocol Stacks LL1, LL2 may use the same implementation or different implementations controlling a single or multiple network interface cards.

Generally, the processing to be performed by any of the Lower Layer Protocol Stacks LL1, LL2 can be realized by means of current technology as is well known to those skilled in the art and thus will not be described in detail.

Message Origin Identification/Authentication Subsystem

The Message Origin Identification/Authentication subsystem MO provides information on the origin of a received message (called origin-related information in the sequel) that is needed by the subsystem SCM to correlate request- or response-type messages to individual Session Contexts SC-U, SC-W, SC-Y based on the assumed or verified origin of those messages. The subsystem MO interacts via application programming interface API1 with the Lower Layer Protocol Stack LL1 in order to obtain or send TCP segments or datagrams from or to a remote communication endpoint denoted by a descriptor D and to retrieve any origin-related information concerning that remote communication endpoint as available at the transport layer (such as the peer IP address or the SSL/TLS/WTLS session identifier). The descriptor D provided by the Lower Layer Protocol Stack LL1 serves the subsystem MO to refer to the TCP connection or SSL/TLS/WTLS secure connection to a specific Initiator, or to refer to a peer communication endpoint at the Initiator Host IH (in the case a connectionless protocol without transport layer security is used to transfer request-type or response-type messages from and to that Initiator).

In the preferred embodiment, the subsystem MO itself supports a socket-like API API2 towards the subsystem AC that involves the use of the same descriptor values as provided by the Lower Layer Protocol Stack LL1.

Depending on the quality of security protection required (e.g., level of integrity assurance and authentication), appropriate origin-related information will be retrieved (either from the Lower Layer Protocol Stack LL1 or computed by the subsystem MO itself using an appropriate authentication protocol) which may comprise, for example:

The IP address of the external host that originated the message (i.e., the Initiator host).

The 4-tuple of source IP address, source port number, destination IP address, and destination port number associated with a single datagram (in the case that a connectionless transport such as UDP/IP is used).

A Security Association Identifier such as the Session Identifier of the SSL, TLS, or WTLS session that governs the security transformations within the secure connection that delivered the request-type or response-type message being handled.

The authenticated principal identity of the peer entity computed by means of any available authentication protocol, such as, for instance, those that are implemented as part of the SSL, TLS, or WTLS protocol, or any other authentication protocols (which may be implemented within the subsystem MO).

Any other means for data origin authentication (optionally, in conjunction with a data integrity service) using, for instance, mechanisms such as digital signatures.

Any type of security token (e.g., a secret generated and subsequently cryptographically protected by the Initiator to guarantee the confidentiality of the secret as well to protect against replay attacks) passed for some period of time with any request-type message originating from the Initiator Domain). Optionally, this secret may be passed among applications and hosts within an Initiator Domain resulting in the implicit authorizations registered in a given Session Context being or becoming effective for any of those applications and hosts that is able to provide the proper secret for this Session Context. Furthermore, this secret may be passed among Target Domains that cooperate in that when a first Target Domain passes a reference or URI for a Target in a second, cooperating Target Domain to an Initiator (or any application in an Initiator Domain) that Initiator will be implicitly authorized to access that Target in the second Target Domain. In this context, co-operation among Target Domains implies selectively exchanging session context-specific state among Target Domains.

or any combination thereof.

Any of the above listed types of origin-related information can be produced by means of current technology as is well known to those skilled in the art and thus will not be described in detail. The type of origin-related information to be supported in a given implementation depends on the quality of security protection required. A given implementation of the present invention may implement matching processes for all types of origin-related information listed above or for any subset thereof as governed by the particular requirements of the specific field of application.

Having retrieved the required origin-related information, MO calls the subsystem SCM (thereby providing the retrieved origin-related information and the descriptor D being associated with the data item obtained from LL1) to select a proper Session Context SC if it exists or to create a new one. In the case, the embodiment supports multiple types of origin-related information, a list of origin-related information items ordered according to the level of trust into the means of authentication (called authentication level, with higher levels indicating cryptographically stronger verification procedures) will be produced and passed to SCM.

FIG. 5a shows the processing of TCP segment(s) or datagram(s) inside the subsystem MO. These TCP segment(s) or datagram(s) have been obtained via the application programming interface API1 from the Lower Layer Protocol Stack LL1. The processing starts at MO-10 and control passes to block MO-11 in which subsystem MO accepts the next TCP segment(s) (or datagram(s) if a connectionless protocol is used) from Lower Layer Protocol Stack LL1. If a new connection has been established with this TCP segment, the socket descriptor D for this (secured if SSL/TLS/WTLS is applied) connection is retrieved and maintained by subsystem MO. In the case of connectionless transport protocols being used, the transport addresses of the communicating peers (Initiator Host IH and Gateway Machine GWM) consisting of IP addresses and port numbers used on both ends serves as descriptor D for any datagrams accepted from a given Initiator.

Control then passes to block MO-12 in which for each new TCP/IP connection or SSL/TLS/WTLS connection being established, or for each datagram being received (when using an insecure, connectionless protocol), any available transport level origin-related information concerning this connection or datagram is retrieved from Lower Layer Protocol Stack LL1. The origin related information could be, for example, an IP address, an SSL/TLS/WTLS session identifier, or an authenticated peer identity as found in an SSL/TLS/WTLS client certificate. Optionally, (in the case of a connection-oriented protocol being used) an authentication protocol may be executed with the Initiator in order to authenticate the Initiator. For example, a challenge mechanism may be used such as the IETF PPP Authentication Protocol (W. Simpson, "PPP challenge handshake authentivation protocol (CHAP), August 1996, published in the World Wide Web of the Internet under the adress www.ietf.org/rfc.html [RFC 1994.txt]). Generally, any origin-related information related to the accepted connection or datagram which may denote the assumed or verified origin of that message might be retrieved in this block.

Control then passes to block MO-13 in which the stream of accepted TCP segments or datagrams is partitioned into individual data items each representing an individual application-layer protocol element (i.e., request-type or response-type message). If available, this processing is based on the length field found in message headers (e.g., the message_size field found in GIOP headers). If no length field is available in the used application protocol, the message stream will be parsed and partitioned into individual messages based on the structure recognized as a result of the parsing.

Control then passes to block MO-14 in which in the case the header of the (request-type) application-layer protocol element contains some form of security token generated by the Initiator (e.g., this could have been carried as a service context in a GIOP message), this type of application-level origin-related information will also be retrieved. (*Note, this is an optional step and control may alternatively pass directly from MO-13 to MO-15.)

At block MO-15: Once per connection (in the case, a connection-oriented transport layer protocol or SSL/TLS/WTLS is used), or (in the case, a connectionless transport layer protocol is used) once for each datagram having been accepted, or whenever some application-level origin-related information has been found m a request-type message header accepted from the Initiator, the Session Context Manager SCM is called to select (if it already exists) or to create (if not existing) a proper Session Context SC-W. Thereby, the Session Context Manager SCM is supplied with any retrieved origin-related information (provided as an ordered list with the elements containing the origin-related information with the highest authentication level coming first) as well as the descriptor D being assigned by from Lower Layer Protocol Stack LL1 to this source of messages with the latter being registered as a handle to Session Context SC-W.

Control then passes to block MO-16 in which the data item containing the request-type or response-type message obtained from the Initiator is passed on via the application programming interface API2 to the next subsystem (i.e., to the Access Control Decision & Enforcement subsystem AC).

FIG. 5b shows the processing within subsystem MO for any data items accepted at application programming interface API2 from subsystem AC in order to be sent back to the Initiator. Those data items contain either response-type messages or (in certain cases) request-type message.

The processing within subsstem MO starts at block MO-20 and control passes to block MO-21 in which a data item containing a response-type or request-type message is accepted from subsystem AC.

Then control passes on to block MO-22, in which the accepted data item is passed on to Lower Layer Protocol Stack LL1 in order to be processed according to the agreed and implemented security transformation (such as the security transformation defined by the SSL protocol) and finally to be delivered to the external destination according to the destination address (peer socket) referred to by the used descriptor D.

Access Control Decision & Enforcement Subsystem

The Access Control Decision & Enforcement subsystem (depicted in FIG. 4a as subsystem AC) obtains via a socket-like application programming interface API2 individual data items from subsystem MO, with each data item containing either a request-type message or a response-type message. These data items accepted from subsystem MO or sent back to subsystem MO via application programming interface API2 are associated in some way with a descriptor D which originally has been assigned by LL1 to the segment(s) or data-gram(s) that originally carried the data item.

Subsystem AC filters and processes the stream of messages accepted via application programming interface API2 whereby it simply passes all data items containing response-type messages without further processing or modification on via application programming interface API3 to the next subsystem IA, while all data items containing request-type messages will be submitted to an access control decision process and subsequently either skipped with or without an exceptional response message (if access has been denied) or passed on via via application programming interface API3 to subsystem IA if access has been granted. In the direction, from the Target Host TH towards the Initiator Host IH all data items accepted via application programming interface API3 from subsystem IA will be simply passed through via application programming interface API2 to subsystem MO without processing. When passing a given data item in any direction through subsystem AC, at both application programming interfaces API2, API3 the same descriptor D is used. In both directions, this descriptor D serves to associate the request-type or response-type containing data items with the proper connection to the remote communication endpoint (i.e., the Initiator Host IH) as well as with a proper Session Context (as originally selected by the Session Context Manager SCM).

Referring now to FIG. 6a and FIG. 6b, a detailed description of the processing performed inside the subsystem AC is given. In FIG. 6a, FIG. 6b and the description following in the sequel, elements also shown in FIG. 4a have the same reference numerals.

As shown in FIG. 6a, the processing in the Access Control Decision & Enforcement subsystem AC starts at AC-10 and then proceeds to block AC-11 which accepts the next data item associated with a descriptor D from the Message Origin Identification/Authentication subsystem MO via an application programming interface API2 with this data item containing either a request-type message or a response-type message.

Control then proceeds to block AC-12 which checks the message header passed within the data item being accepted to see if the data item contains a request-type message. Control then passes to the decision block AC-13 which determines the outcome of the check made in block AC-12. If the message is not a request-type message, control is passed to block AC-19 in which the data item is simply forwarded to the next subsystem IA.

If the message is a request-type message, then control passes to block AC-14 in which the object key, object reference, or URI denoting the Target of the request-type message is retrieved from the message header or message body contained in the data item. Control then passes to block AC-15 in which an Access Control Policy rule base is consulted to find out if the request to the Target which reference has been retrieved in block AC-14 is allowed. For bootstrapping and other purposes certain targets may have to be made accessible without any prior Implicit Authorization. Those targets could either be defined as allowed target (i.e., explicitly authorized) in such an Access Control Policy, or would have to be registered automatically when initializing a new Session Context.

Control then passes to the decision block AC-16 which determines the outcome of the check made in block AC-15. If the request to the Target is explicitly authorized (i.e., access is to be granted according to the Access Control Policy rule base), control is passed to block AC-19.

If the request to the Target is not explicitly authorized (according to the Access Control Policy rule base), control passes to block AC-17 in which the subsystem in the Session Context Management subsystem SCM is called with a 'CHECK CONTEXT' request REQ2 in order to search the Session Context Data Item SC-U, SC-W, SC-Y referred to by the descriptor D provided by subsystem AC for the object key, reference, or URI that has been retrieved in block AC-14. The outcome of this search is returned by the Session Context Manager SCM.

Control then passes to the decision block AC-18 which determines the outcome of the call to by the Session Context Manager SCM. If the Session Context Manager SCM indicates that the key, reference, or URI has been found, control is passed to block AC-19 (if key, reference, or URI has been found in given Session Context, than the access to the Target referred to by the key, reference, or URI is assumed to be implicitly authorized and access should be granted by subsystem AC).

If by the Session Context Manager SCM indicates that the key, reference, or URI has not been found, control is passed to block AC-20 which simply drops the data item containing the request-type message without passing it on to the next subsystem. Control then passes either to block AC-21 (this is an optional step) in which a response-type message is generated indicating the exceptional event that access has been denied and subsequently the subsystem terminates or the subsystem may terminate right after completing bock AC-20 without passing control to block AC-21.

FIG. 6b shows the processing of those data items that have been accepted by subsystem AC at application programming interface API3 from subsystem IA. The processing starts at block AC-30 and control passes to block AC-31 in which the next data item associated in some way with descriptor D and containing either a request-type message or a response-type message is accepted at application programming interface API3. Control then proceeds to block AC-32 in which the same data item (without any further processing) is passed on (using application programming interface API2) towards subsystem MO.

Implicit Authorization Subsystem

The Implicit Authorization subsystem IA of FIG. 4a obtains from subsystem AC via a socket-like application programming interface API3 of FIG. 4a individual data items which are associated with a given descriptor D, with each data item containing either a request-type message or a response-type message and forwards those retrieved data items without further processing via a further application programming interface application programming interface API4 to the Proxy Server PS (or in alternative embodiments directly to the application APP).

Data items accepted at application programming interface API4 which have been sent from subsystem PS (or in alternative embodiments directly from the application APP) will be processed by subsystem IA in order to detect Implicit Authorization events, that is, detect any object references or URIs passed as a parameter or within the body of the message contained in the data item accepted at the application programming interface application programming interface API4. Subsequently, the data item containing the request-type or response-type message is passed via the application programming interface API3 on to subsystem AC. When forwarding a given data item in any direction through subsystem IA, at both application programming interfaces API3, API4 the same descriptor D is used.

Referring now to FIG. 7a and FIG. 7b, a detailed description of the processing performed inside the subsystem IA subsystem is given. Elements also shown in FIG. 4a have the same reference numerals.

FIG. 7a shows the processing of those data items that have been obtained by subsystem IA via the application programming interface API3 from subsystem AC and passed on via the application programming interface API4 towards subsystem PS (or, in alternative embodiments as application level interceptor ALI directly towards the application APP). The processing starts at block IA-10 and control passes to block IA-11 in which the next data item associated in some way with descriptor D and containing either a request-type message or a response-type message is obtained via the application programming interface API3 from subsystem AC. Control then proceeds to block IA-12 in which the same data item (without any further processing) is passed on via the application programming interface API4 towards subsystem PS (or application APP) again associated to the same descriptor D.

FIG. 7b shows the processing of data items accepted at the application programming interface API4 and originating from subsystem PS (or in alternative embodiments as application level interceptor, originating directly from the application APP) and to be forwarded (after processing) towards subsystem AC.

The processing starts at block IA-20 and control passes to block IA-21 in which the next data item from subsystem PS or application APP associated in some way with descriptor D and containing either a request-type message or a response-type message is accepted at the application programming interface API4. Control then proceeds to block IA-22 in which the body or parameters of the response-type message or request-type message contained in the accepted data item is scanned or parsed for any object references or URIs being passed with this message.

Control then passes to the decision block IA-23 which determines the outcome of the scanning process. If no object reference or URI has been found, control is passed to block IA-25 in which the data item containing the response-type or request-type message is passed on towards subsystem AC thereby using application programming interface API3 and the same descriptor D that has been associated with the data item when it has been accepted at the application programming interface API4.

If an object reference or URI or multiple object references or URIs have been found by the scanning process, control is passed to block IA-24 in which the subsystem in the Session Context Management subsystem SCM is called with a 'MODIFY CONTEXT' request REQ3 asking the Session Context Management subsystem SCM to register the found object reference(s) or URI(s) with the Session Context Data Item referred to by a descriptor D provided by subsystem AC.

Control then passes to block IA-25 in which the data item with the response-type or request-type message is passed on towards subsystem AC. The process terminates thereafter.

Session Context Management Subsystem

The Session Context Management subsystem SCM of FIG. 4a maintains the state of all (potentially concurrently existing) Ingress Sessions as a variable number of Session Context data items, manages the creation and deletion of any Session Context Data Item, serves requests quests from subsystem MO to select an appropriate Session Context Data Item SC-U, SC-W, SC-Y for a given connection or socket pair (in the case, a connection-less transport layer protocol is used), serves requests from subsystem AC to check a given Session Context Data Item Item SC-U, SC-W, SC-Y for an Implicit Authorization to access a certain target Target1, Target2, and serves requests from subsystem IA to modify a given Session Context Data Item SC-U, SC-W, SC-Y in order to register a newly found object reference or URI.

FIG. 8 shows the general structure of a Session Context Data Item SC-U, SC-W, SC-Y that is able to maintain the complete Session Context of a single Ingress Session.

Referring to FIG. 8, the DESCRIPTOR ATTRIBUTE SCA1 contains the (maybe repeatedly changed) descriptor D provided by subsystem MO to be registered as a handle to this Session Context Data Item SC-U, SC-W, SC-Y. The descriptor is a simple means to associate request-type message data items or response-type message data items being handled by the subsystems MO, AC, IA with a given Session Context. Other means to achieve this association are possible (such as passing a handle which refers to the selected Session Context with each message data item being processed within the subsystems MO, AC, IA). The value contained in the DESCRIPTOR ATTRIBUTE SCA1 may change during the lifetime of the Session Context: the DESCRIPTOR ATTRIBUTE will be cleared when the contained descriptor D is de-registered and it will be set when a new descriptor D2 for this Session Context is registered.

In an alternative embodiment where the subsystem MO is replicated on n hosts the DESCRIPTOR ATTRIBUTE SCA1 may actually hold set of descriptors D (D1 to Dn) which each individual instance of subsystem MO having its own distinct descriptor.

The SESSION ORIGIN ATTRIBUTE SCA2 is set at the time of the creation of the containing Session Context Data Item and will not be changed during the lifetime of the corresponding Ingress Session. The SESSION ORIGIN ATTRIBUTE SCA2 denotes the mandatory Origin Related Information (ORI) that must have been associated by some means with a message received from an Initiator in order for this message to be assigned to this particular Session Context Data Item.

The (optional) attribute 'LIST OF CURRENT ORI DATA ITEMS' SCA3 holds a list of Origin Related Information (ORI) containing data items provided by subsystem MO with the most recent 'SELECT CONTEXT' request. The value contained in this attribute may change during the lifetime of a given Session Context Data Item: That is, this attribute will be cleared whenever SCA1 in the same Session Context Data Item is cleared and it will be set when a new descriptor D is registered (i.e., when SCA1 is set). This attribute (if implemented) serves during an access control decision (in the event, an Implicit Authorization is not found in the current Session Context Data Item) to refer to further Session Context Data Items that may contain an Implicit Authorization required to grant access. Those further Session Context Data Items being referred to are those which SESSION ORIGIN ATTRIBUTE matches any of the ORI DATA ITEMS found in the LIST OF CURRENT ORI DATA ITEMS stored in this Session Context Data Item.

Most important, each Session Context Data Item contains an attribute 'LIST OF IMPLICITLY AUTHORIZED OBJECT REFERENCES/URIS' SCA4. This attribute contains the list of object references or URIs the session peer (identified by SCA2) has implicitly been authorized to access in the context of the Ingress Session being represented by this Session Context Data Item.

The IDLE TIME ATTRIBUTE SCA5 of a given Session Context Data Item SC-U, SC-W, SC-Y may be reset each time a message assigned to this Session Context is handled by any of the subsystem MO, subsystem AC or subsystem IA. The interactions required to reset this attribute are obvious and not shown in any of the Figure provided. The expiration of the Idle Timer related to the IDLE TIME ATTRIBUTE SCA5 in a Session Context Data Item may serve to terminate the corresponding Ingress Session and to release any system resources related to the corresponding Session Context Data Item.

Individual Session Context Data Items and attributes thereof may be read, modified, or deleted by means of simple management activities not shown in detail. Worth mentioning, a deletion (by means of management activity) of a certain member of the list of object references or URIs contained in the attribute SCA4 of a certain selected Session Context Data Item SC-W allows to selectively revoke any Implicit Authorization previously made in the corresponding Ingress Session W.

Referring now to FIG. 9, the processing of 'SELECT CONTEXT' requests within the Session Context Manager SCM will be described. The processing starts at block SCM-10 and control passes to block SCM-11 in which a given 'SELECT CONTEXT' request from subsystem MO is accepted which asks to select or create an appropriate Session Context Data Item SC-U, SC-W, SC-Y. With this request, the subsystem MO provides a list of Origin Related Information (ORI) containing data items and a descriptor D.

Control then proceeds to block SCM-12 in which any previous use of the descriptor D value in any of the Session Context Data Items maintained by the Session Context Manager SCM is de-registered. De-registration is achieved by checking all Session Context Data Items maintained by the Session Context Manager SCM to find out if the descriptor value D has already been stored inside the Descriptor Attribute and if it is found in any Session Context Data Item to simply clear this Session Context Data Item's. Descriptor Attribute. In the optional case, this Session Context Data Item contains a 'List of Current ORI Data Items' attribute, this attribute is also to be cleared. A de-registration is necessary in the case, that a re-use of descriptor values by the algorithm in Lower Layer Protocol Stack LL1 which generates these descriptors can not be ruled out.

Control then passes to block SCM-13 in which from the list of Origin Related Information (ORI) data items supplied by subsystem MO the first data item DI1 (which is the ORI data item with the highest authentication level) is picked and the complete set of Session Context Data Items maintained by the Session Context Manager SCM is searched for a matching Session Origin Attribute value.

Control then passes to the decision block SCM-14 which determines the outcome of the search. If a Session Origin Attribute value matching the data item DI1 picked from the list of Origin Related Information (ORI) data items provided by subsystem MO is found in one of the Session Context Data Items maintained by the Session Context Manager SCM (this Session Context Data Item is denoted as Session Context Data Item SC-W in the sequel), control passes directly to block SCM-18.

If no matching Session Origin Attribute value is found in any of the Session Context Data Items maintained by the Session Context Manager SCM control passes to block SCM-15 in which a new Session Context Data Item (this Session Context Data Item is denoted as SC-W in the sequel) is created and control passes to block SCM-16 in which SC-W is initialized. The initialization may include the initialization of the Initialize Idle Timer attribute shown as Session Context Attribute SCA5 in FIG. 8 or the initialization of the 'List of Implicitly Authorized Object References/URIs' attribute (shown as SCA4 in FIG. 8) with an initial set of object references or URIs that have to be accessible initially for purposes of bootstrapping. After completion of the initialization routines executed in block SCM-16 control passes to block SCM-17 in which the Origin Related Information (ORI) data item DI1 (the ORI data item with the highest authentication level) picked from the list of Origin Related Information data items provided by MO is registered inside the Session Origin Attribute (shown as Session Context Attribute SCA2 in FIG. 8) of the newly created Session Context Data Item SC-W.

Control then passes to block SCM-18 in which the descriptor D as provided by subsystem MO with the 'SELECT CONTEXT' request is registered as the new handle for the selected or newly created Session Context Data Item SC-W. D is registered by storing it inside the Descriptor Attribute (shown as Session Context Attribute SCA1 in FIG. 8) of the selected or newly created Session Context Data Item SC-W. Control then passes to block SCM-19 in which the list of Origin Related Information (ORI) containing data items provided by subsystem MO with the SELECT CONTEXT request is stored inside the LIST OF CURRENT ORI DATA ITEMS (shown as Session Context Attribute SCA3 in FIG. 8) of the selected or newly created Session Context Data Item SC-W. The process terminates at block SCM-21.

Figure 10:
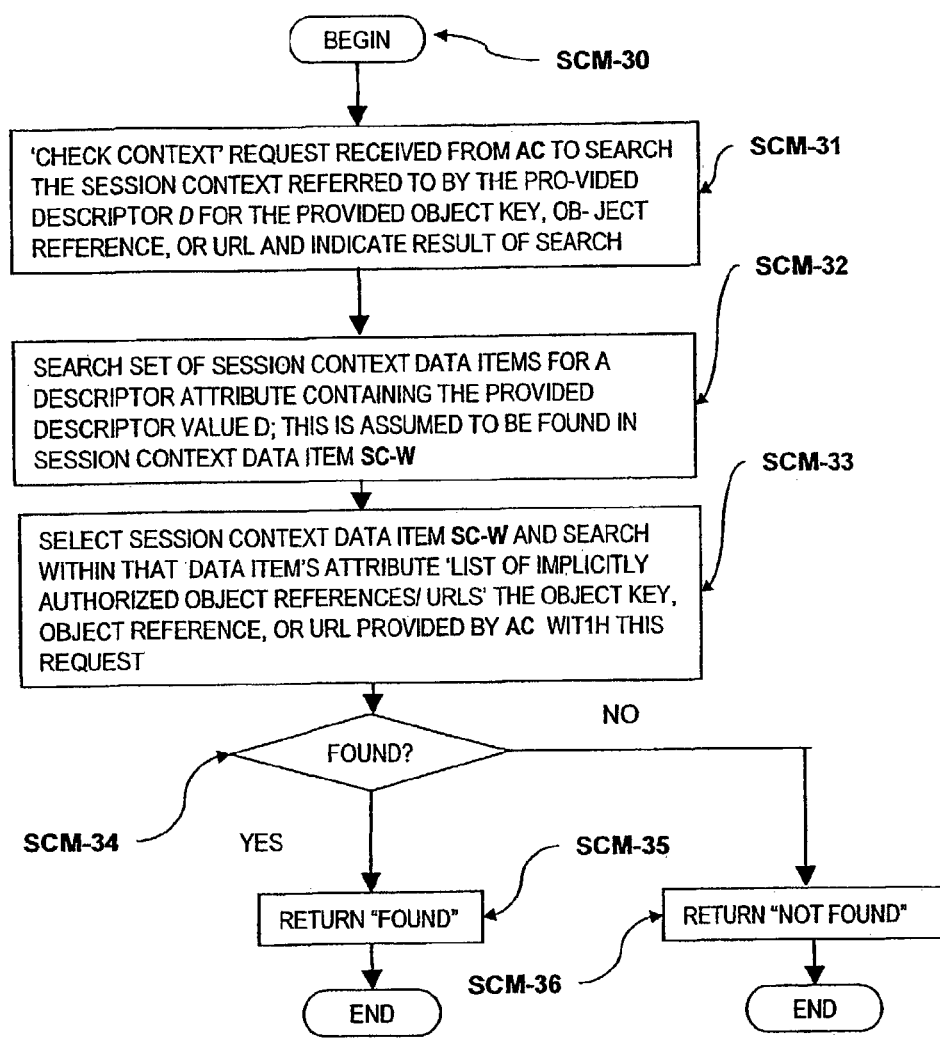
FIG. 10 is a flow chart showing the processing inside the Session Context Management subsystem when handling 'CHECK-CONTEXT' requests from the Access Control Decision & Enforcement subsystem.

Referring now to FIG. 10, the processing of 'CHECK CONTEXT' requests within the Session Context Manager SCM will be described. The processing starts at block SCM-30 and control passes to block SCM-31 in which a given 'CHECK CONTEXT' request from subsystem AC is accepted which asks to check if the object key, object reference, or URI provided by subsystem AC with this request has been stored within the LIST OF IMPLICITLY AUTHORIZED OBJECT REFERENCES/URIS attribute of the Session Context Data Item SC-W corresponding to the descriptor D provided by subsystem AC with this request.

Control then passes to block SCM-32 which selects the proper Session Context Data Item SC-W, SC-U, SC-Y which DESCRIPTOR ATTRIBUTE value matches the descriptor D provided by subsystem AC with the 'CHECK CONTEXT' request. This selected Session Context Data Item is called Session Context SC-W in the sequel.

Control then passes to block SCM-33 which searches the 'List of Implicitly Authorized Object References/URIs' attribute (shown as Session Context Attribute SCA4 in FIG. 8) of the Session Context Data Item SC-W for a value matching the object key, object reference, or URI provided by subsystem AC with this 'CHECK CONTEXT' request.

Control then passes to the decision block SCM-34 which determines the outcome of the search. If a list element matching the object key, object reference, or URI provided by subsystem AC is found in the 'List of Implicitly Authorized Object References/URIs' attribute, control passes to block SCM-35 in which a 'FOUND' is returned to subsystem AC and the process is terminated. Otherwise, control is passed to block SCM-36 in which a 'NOT FOUND' is returned to subsystem AC and the process is terminated.

Figure 11:
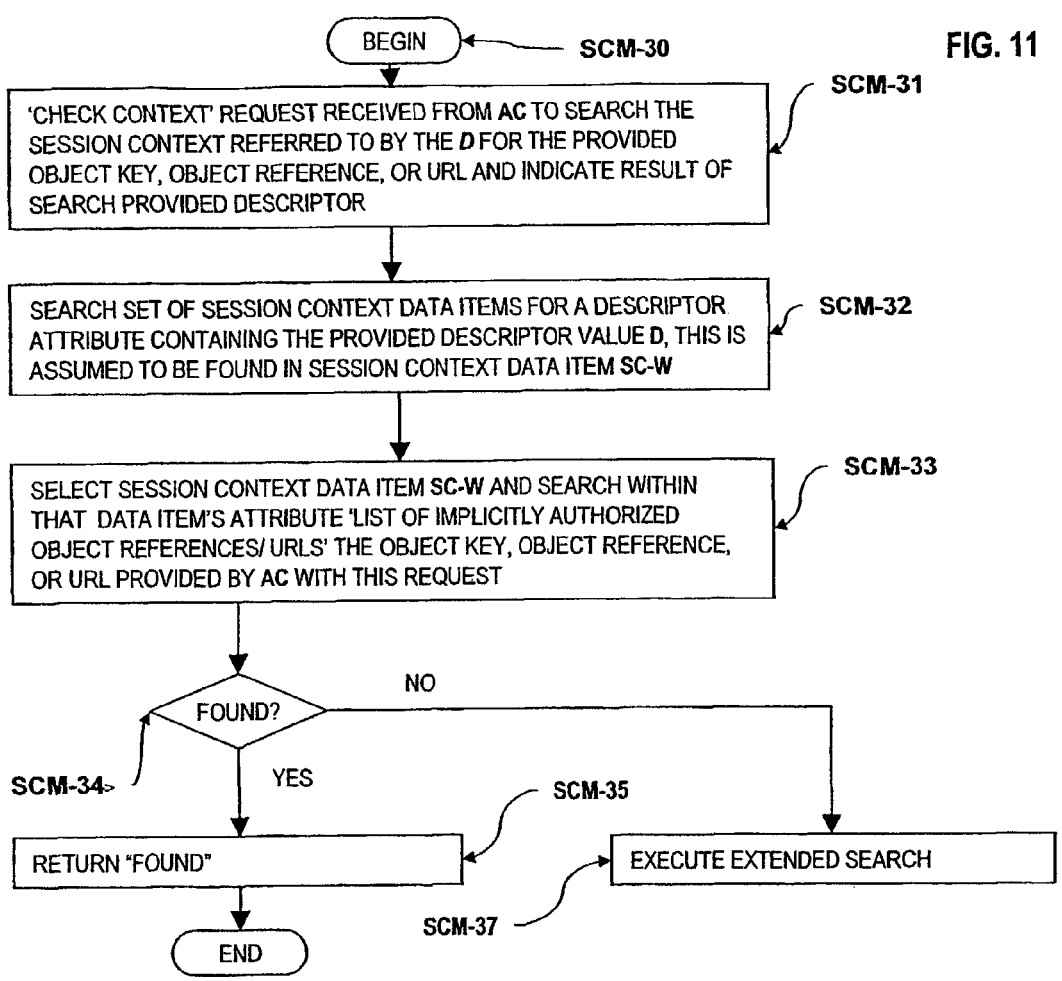
FIG. 11 is a flow chart showing the processing inside the Session Context Management subsystem performing an extended search when handling 'CHECK-CONTEXT' requests from the Access Control Decision & Enforcement subsystem.

Referring now to FIG. 11, an optional, extended processing of 'CHECK CONTEXT' requests is shown. The extension refers to an extended search for the object key, object reference, or URI provided by subsystem AC with this 'CHECK CONTEXT' request in the case a matching value is not found in the Session Context Data Item referred to by the descriptor D provided by subsystem AC. The extended processing described in detail in FIG. 12, continues the search in further Session Context Data Items maintained by System Context Manager SCM which are selected with the help of the 'LIST OF CURRENT ORI DATA ITEMS' attribute (shown as Session Context Attribute SCA3 in FIG. 8).

In FIG. 11 and the description following in the sequel, elements also shown in FIG. 10 are given the same reference numerals. Referring to FIG. 11, the processing in block SCM-30 to SCM-35 is as described above in conjunction with FIG. 10. The description following in the sequel concentrates on those blocks that are specific to the extended processing.

Control passes from block SCM-33 to the decision block SCM-34 which determines the outcome of the search. If a list element matching the object key, object reference, or URI provided by subsystem AC is found in the 'List of Implicitly Authorized Object References/URIs' attribute, control passed to block SCM-35 which processing is as described above.

Otherwise, if no such matching element has been found in the 'List of Implicitly Authorized Object References/URIs' attribute of the Session Context Data Item SC-W, control passes to block SCM-37 in which an extended search for the object key, object reference, or URI provided by subsystem AC is started. The block SCM-37 is described in greater detail in FIG. 12 in the sequel.

Figure 12:
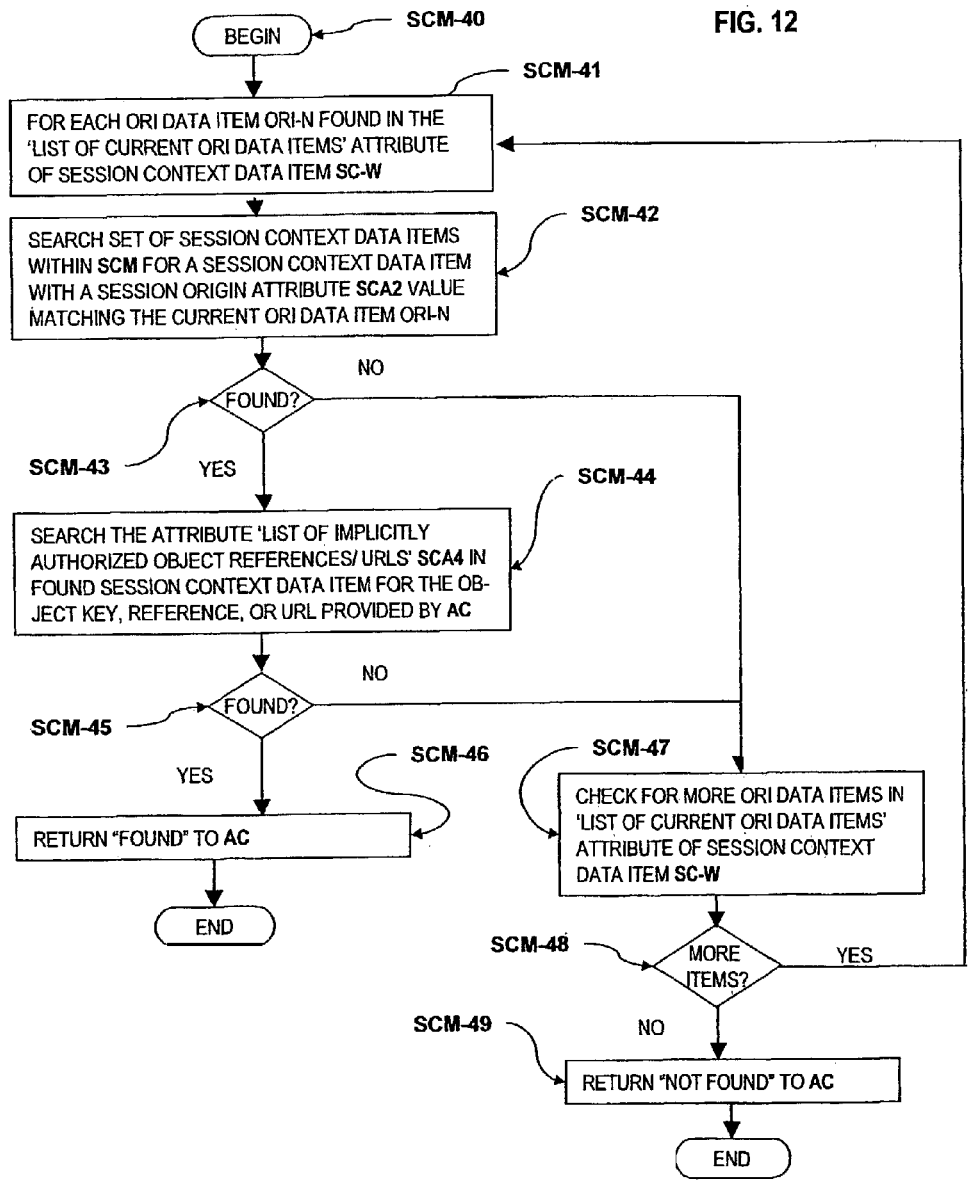
FIG. 12 is a flow chart showing the extended processing of block SCM-37 in FIG. 11 needed to support an extended search.

Referring now to FIG. 12, the processing of the extended search starts at block SCM-40 and proceeds to block SCM-41 which selects the first list element from the list contained in the attribute 'LIST OF CURRENT ORI DATA ITEMS' (shown as Session Context Attribute SCA3 in FIG. 8) of the Session Context Data Item SC-W. This element is an Origin Related Information (ORI) data item denoting some additional Origin Related Information with respect to the Initiator which sent the current request-type message to be granted or denied.

Control then passes to block SCM-42 in which the total set of Session Context Data Items maintained by the Session Context Manager SCM is searched for a Session Origin Attribute (shown as Session Context Attribute SCA2 in FIG. 8) value matching the Origin Related Information (ORI) data item selected in block SCM-41.

Control then passes to the decision block SCM-43 which determines the outcome of the search. If no such matching value has been found in any Session Origin Attribute of any Session Context Data Item maintained by the Session Context Manager SCM control passes directly on to block SCM-47 in which the list contained in the attribute 'LIST OF CURRENT ORI DATA ITEMS' (shown as Session Context Attribute SCA3 in FIG. 8) of the Session Context Data Item SC-W is checked for more list elements remaining. Control then passes to a further decision block SCM-48 which determines the outcome of block SCM-47. If more data items are contained in that list, control passes back to block SCM-41 where the next not yet processed Origin Related Information (ORI) data item from the attribute 'LIST OF CURRENT ORI DATA ITEMS' (shown as Session Context Attribute SCA3 in FIG. 8) will be handled as described above. If no more data items have been found by the check in block SCM-47, control passes to block SCM-49 in which a "NOT FOUND" is returned to subsystem AC and the processing terminates.

If the decision block SCM-43 determines that the search performed in block SCM-42 found a matching value in some Session Origin Attribute of some Session Context Data Item SC-Y control proceeds to block SCM-44 in which the 'List of Implicitly Authorized Object References/URIs' attribute of that Session Context Data Item SC-Y is searched for the object key, object reference, or URI provided by subsystem AC.

Control then passes to a further decision block SCM-45 which determines the outcome of the search. If a list element matching the object key, object reference, or URI provided by subsystem AC is found in the 'List of Implicitly Authorized Object References/URIs' attribute of SC-Y, control passes to block SCM-46 in which a 'FOUND' is returned to subsystem AC and the process is terminated. Otherwise, control is passed to block SCM-47 in which the list contained in the attribute 'LIST OF CURRENT ORI DATA ITEMS' (shown as Session Context Attribute SCA3 in FIG. 8) of the Session Context Data Item SC-W is checked for more list elements remaining as described above.

In a further preferred embodiment of the present invention the following scenario is also possible: Selectively (e.g., filtered per object type), a Session Context in a cooperating Session Context Management subsystem of a further Application-level Interceptor or Application-level Gateway may be consulted. This requires a Session Context Management subsystem to Session Context Management subsystem interaction to be based on a CORBA like interaction mechanism (e.g., CORBA, DCOM, Java RMI, SOAP). Session Context Management subsystems may maintain knowledge about such cooperating Session Context Management subsystems. In this case, the proper Session Context in that cooperating Session Context Management would have to be selected by that cooperating Session Context Management based on ORI provided by the first Session Context Management. If that Session Context in the cooperating Session Context Management contains a record for an implicit authorization for the Object Reference, key, or URI denoting the target of the current request to be decided upon, access will be granted.

Figure 13:
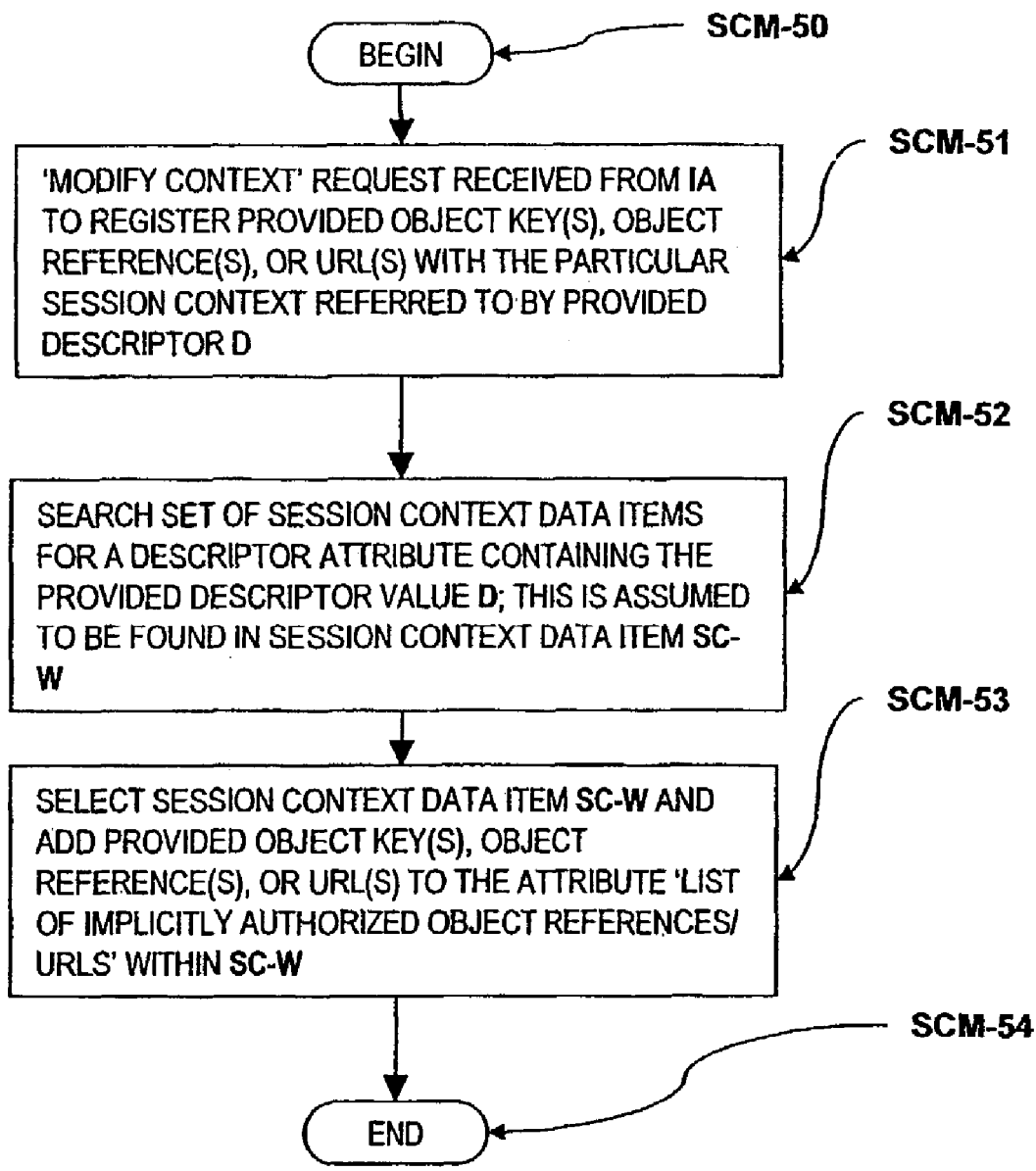
FIG. 13 is a flow chart showing the processing inside the Session Context Management subsystem when handling 'MODIFY-CONTEXT' requests from the Implicit Authorization subsystem.

Referring now to FIG. 13, the processing of 'MODIFY CONTEXT' requests within Session Context Manager SCM will be described. The processing starts at block SCM-50 and control passes to block SCM-51 in which a 'MODIFY CONTEXT' request from subsystem IA is accepted which asks to register the object reference(s) or URI(s) provided by subsystem IA with, this request in the proper Session Context Data Item SC-W corresponding to the descriptor D also provided by subsystem IA.

Control then passes to block SCM-52 which selects among the Session Context Data Items maintained by the Session Context Manager SCM that Session Context Data Item which DESCRIPTOR ATTRIBUTE value matches the descriptor D provided by subsystem IA with the 'MODIFY CONTEXT' request. This selected Session Context Data Item is called Session Context Data Item SC-W in the sequel.

Control then passes to block SCM-53 in which the object reference(s) or URI(s) provided by subsystem IA is (are) added to the 'LIST OF IMPLICITLY AUTHORIZED OBJECT REFERENCES/URIS' attribute of Session Context SC-W.

The processing terminates at block SCM-54 and control returns to subsystem IA.

The invention claimed is:

1. An ingress-session-based authorization and access control method in a data processing system to control access from an initiator-host to objects on a target host comprising the steps of:
   (i) receiving an access-request originally coming from the initiator-host, that references an object on the target host to access,
   (ii) assigning the access-request to an ingress-session and selecting a session context belonging to that ingress-session,
   (iii) checking whether the access to the referenced object is authorized in the selected session-context or not,
   (iv) denying the access to the referenced object if the access to said object on the target host is not authorized in the selected session context,
   (v) granting the access to the referenced object if the access to said object on the target host is allowed in the selected session context,
   (vi) handing over references to objects on the target host to the initiator-host as a response to a granted access-request, and
   (vii) authorizing the handed over reference for access in that session-context.

2. An ingress-session-based authorization and access control method according to claim 1 characterized in that the assignment of the access-request to the ingress-session and the selection of the session-context belonging to that ingress-session is independent of an underlying data transport session.

3. An ingress-session-based authorization and access control method according to claim 1 characterized in that the assignment of the access-request to the ingress-session and the selection of the session-context belonging to that ingress-session is independent of the structure, the format and content of the object references handed over to the initiator host.

4. An ingress-session-based authorization and access control method according to claim 1 characterized in that the object the reference is handed over for is authorized for access for a maximum number of accesses under the handed over reference in that session-context the already granted access request is assigned to.

5. An ingress-session-based authorization and access control method according to claim 1 characterized in that the object the reference is handed over for is authorized for access for an access-validity time period so that access is granted during said access-validity time period under the handed over reference in that session context the already granted access-request is assigned to.

6. An ingress-session-based authorization and access control method according to claim 1 characterized in that the access-request coming from the initiator host is received via a public-key encrypted channel.

7. An ingress-session-based authorization and access control data processing system to control access from an initiator-host to objects on a target host comprising:
   means to receive an access-request originally coming from the initiator-host, that references an object on the target host to access,
   means to assign the access-request to an ingress-session and selecting a session-context belonging to that ingress-session,
   means to check whether the access to the referenced object is authorized in the selected session-context or not, that deny the access to the referenced object if the access to said object on the target host is not authorized in the selected session-context and that grants the access to the referenced object if the access to said object on the target host is allowed in the selected session-context,
   means that hand over references to objects on the target host to the initiator-host as a response to a granted access-request, and
   means that authorize objects the reference is handed over for, for access under the handed over reference in that session-context the already granted access request is assigned to.

8. An ingress-session-based authorization and access control data processing system according to claim 7 characterized in that said means to assign the access request to an ingress-session and to select a session-context belonging to that ingress-session do assign the access-request to the ingress session and do select the session-context belonging to that ingress-session independently from any underlying data transport session.

9. An ingress-session-based authorization and access control data processing system according to claim 7 characterized in that said means to assign the access request to an ingress-session and to select a session-context belonging to that ingress-session do assign the access-request to the ingress session and do select the session-context belonging to that ingress-session independently from the structure, the format and content of the object references handed over to the initiator host.

10. An ingress-session-based authorization and access control data processing system according to claim 7 characterized in that the system also comprises means that authorize objects the reference is handed over for, for access for a maximum number of accesses under the handed over reference in that session-context the already granted access-request is assigned to.

11. An ingress-session-based authorization and access control data processing system according to claim 7 characterized in that the system also comprises means that authorize objects the reference is handed over for, for access for an access-validity time period so that access is granted during said access-validity time period under the handed over reference in that session-context the already granted access-request is assigned to.

12. An ingress-session-based authorization and access control data processing system according to claim 7 characterized in that the access-request coming from the initiator host is received by cryptographic means that operate a safe channel to the initiator-host.

13. An ingress-session-based authorization and access control data processing system according to claim 7 characterized in that the target host is implemented as an application-module, comprising target objects and wherein said authorization and control system is implemented as an application level-interceptor both installed on one computer system.

14. An ingress-session-based authorization and access control data processing system according to claim 7 characterized in that said authorization and control system is implemented as a gateway-machine installed on a computer system comprising communication means that connect the gateway-machine to an external network and an internal network wherein the initiator-host is connected as a client machine to said external network and the target host is connected as a server machine to said internal network.

15. A communication network comprising an ingress-session based authorization and access control data processing system according to claim 7 comprising bootstrapping target-objects on the target-host as initial contact points to establish access communication wherein the access to said bootstrapping target-objects is granted or denied via explicit authorization means different from said means that check whether the access to the referenced object is authorized in the selected session-context or not.

16. A computer-readable storage medium having stored thereon instructions to cause a processor to execute an ingress-session-based authorization and access control method in a data processing system to control access from an initiator-host to objects on a target host, the method comprising:

(i) receiving an access-request originally coming from the initiator-host, that references an object on the target host to access, (ii) assigning the access-request to an ingress-session and selecting a session-context belonging to that ingress-session, (iii) checking whether the access to the referenced object is authorized in the selected session-context or not, (iv) denying the access to the referenced object if the access to said object on the target host is not authorized in the selected session-context, (v) granting the access to the referenced object if the access to said object on the target host is allowed in the selected session-context, (vi) handing over references to objects on the target host to the initiator host as a response to a granted access-request, and (vii) authorizing the handed over references for access in that session-context.

17. A computer-readable storage medium of claim 16, the method characterized in that the assignment of the access-request to the ingress-session and the selection of the session-context belonging to that ingress-session is independent of an underlying data transport session.

18. A computer-readable storage medium of claim 16, the method characterized in that the assignment of the access-request to the ingress-session and the selection of the session-context belonging to that ingress-session is independent of the structure, the format and content of the object references handed over to the initiator host.

19. A computer-readable storage medium of claim 16, the method characterized in that the object the reference is handed over for is authorized for access for a maximum number of accesses under the handed over reference in that session-context the already granted access-request is assigned to.

20. A computer-readable storage medium of claim 16, the method characterized in that the object the reference is handed over for is authorized for access for an access validity time period so that access is granted during said access-validity time period under the handed over reference in that session-context the already granted access-request is assigned to.

21. A computer-readable storage medium of claim 16, the method characterized in that the access-request coming from the initiator host is received via a public-key encrypted channel.

* * * * *